US008016664B2

(12) United States Patent
Thomas et al.

(10) Patent No.: US 8,016,664 B2
(45) Date of Patent: Sep. 13, 2011

(54) SYSTEMS AND METHODS FOR SIMULATING A PARTICULAR USER IN AN INTERACTIVE COMPUTER SYSTEM

(75) Inventors: Jeffrey J. Thomas, Penngrove, CA (US); Abraham J. Navarro, Hercules, CA (US); Gordon K. Read, San Rafael, CA (US); David M. Zdyrko, Jr., San Francisco, CA (US)

(73) Assignee: Take Two Interactive Software, Inc., New York, NY (US)

( * ) Notice: Subject to any disclaimer, the term of this patent is extended or adjusted under 35 U.S.C. 154(b) by 1190 days.

(21) Appl. No.: 11/105,734

(22) Filed: Apr. 13, 2005

(65) Prior Publication Data

US 2006/0246972 A1    Nov. 2, 2006

(51) Int. Cl.
*A63F 13/00* (2006.01)
(52) U.S. Cl. .......................................................... 463/23
(58) Field of Classification Search .................. 463/1, 4, 463/7, 13, 23, 32, 41–43
See application file for complete search history.

(56) References Cited

U.S. PATENT DOCUMENTS

| | | | |
|---|---|---|---|
| 5,586,257 A | | 12/1996 | Perlman |
| 5,830,067 A | * | 11/1998 | Graves et al. .................... 463/40 |
| 6,106,395 A | * | 8/2000 | Begis ................................. 463/23 |
| 6,319,121 B1 | * | 11/2001 | Yamada et al. ..................... 463/8 |
| 6,400,996 B1 | * | 6/2002 | Hoffberg et al. ................. 700/83 |
| 6,652,378 B2 | | 11/2003 | Cannon et al. |
| 6,663,486 B2 | * | 12/2003 | D'Aurora et al. ............... 463/12 |
| 6,821,205 B2 | * | 11/2004 | Takahashi et al. .............. 463/42 |
| 2002/0072815 A1 | | 6/2002 | McDonough et al. |
| 2002/0082086 A1 | | 6/2002 | Scallie |
| 2002/0083148 A1 | | 6/2002 | Shaw et al. |

(Continued)

FOREIGN PATENT DOCUMENTS

WO    WO 2005/006117 A2    1/2005

*Primary Examiner* — David L Lewis
*Assistant Examiner* — Eric M Thomas
(74) *Attorney, Agent, or Firm* — Kenyon & Kenyon LLP

(57) ABSTRACT

The field of the invention relates to interactive computer systems and more particularly to systems and methods for simulating a particular user's behavior in an interactive computer system. In one embodiment, a computer program product includes a simulator configured to simulate a user interacting with a computer program. The simulator includes a learning mode of operation and a simulation mode of operation. During the learning mode, the simulator is configured to monitor the user's interaction with the computer program for one or more events and analyze one or more current circumstances during the occurrence of the one or more events. The simulator is further configured to record one or more user inputs in response to the occurrence of the one or more events, store the one or more user inputs in one or more data fields, and associate the one or more data fields with the one or more events and the one or more current circumstances. During the simulation mode of operation, the simulator is configured to monitor the computer program for the one or more particular events, retrieve the one or more data fields associated with the one or more particular events, analyze one or more current circumstances upon the occurrence of the one or more particular events, and invoke one or more simulated inputs based on the value of the one or more data fields in response to the occurrence of the one or more events and the one or more current circumstances.

43 Claims, 15 Drawing Sheets

U.S. PATENT DOCUMENTS

| | | |
|---|---|---|
| 2002/0119824 A1 | 8/2002 | Allen |
| 2002/0183117 A1* | 12/2002 | Takahashi et al. .............. 463/42 |
| 2004/0053693 A1 | 3/2004 | An |
| 2004/0058731 A1 | 3/2004 | Rossides |
| 2004/0158337 A1* | 8/2004 | Forest ............................. 700/91 |
| 2004/0263693 A1 | 12/2004 | Herbrich et al. |
| 2004/0266506 A1* | 12/2004 | Herbrich et al. .................. 463/6 |
| 2004/0266526 A1 | 12/2004 | Herbrich et al. |
| 2004/0267683 A1 | 12/2004 | Herbrich et al. |
| 2005/0266925 A1* | 12/2005 | Hornell et al. .................. 463/42 |

* cited by examiner

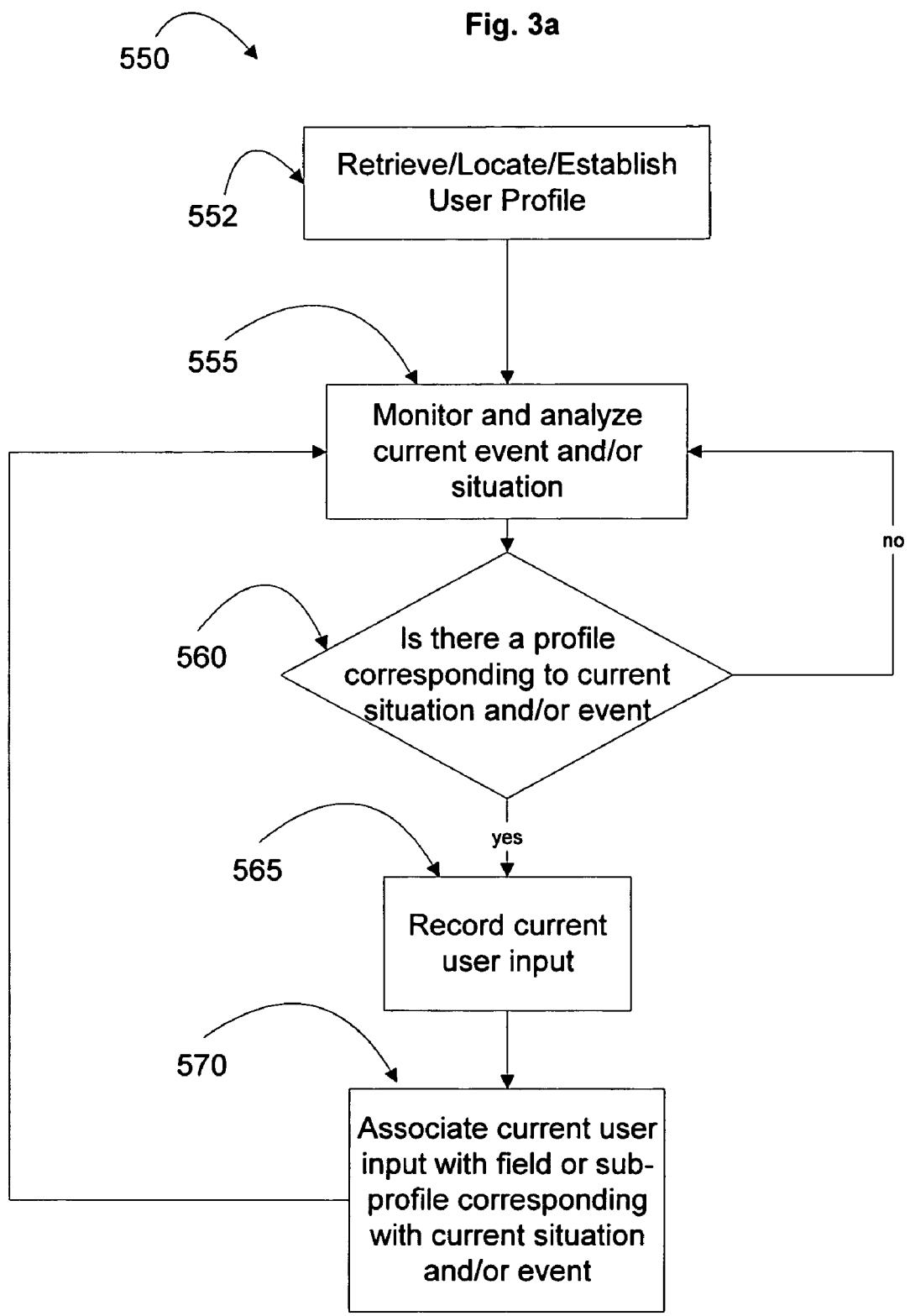

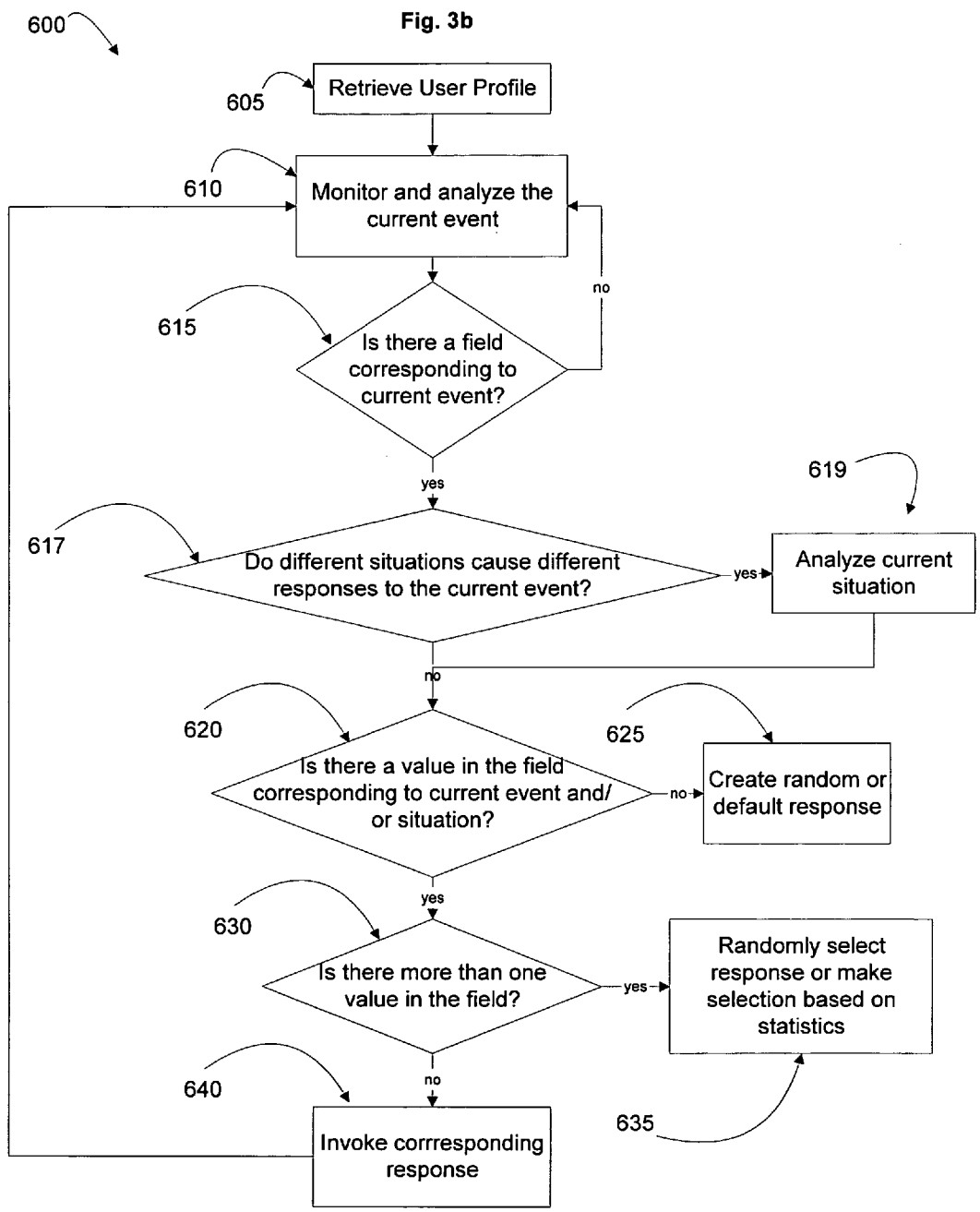

SYSTEMS AND METHODS FOR SIMULATING A PARTICULAR USER IN AN INTERACTIVE COMPUTER SYSTEM

FIELD OF THE INVENTION

The field of the invention relates to interactive computer systems, and more particularly to systems and methods for simulating a particular user's behavior in an interactive computer system.

BACKGROUND OF THE INVENTION

As in real life, a key component in the entertainment value of most videogames is that of competition between opponents, whereby each opponent vies against the competition to win and to become the best. The configuration of competition in videogames can take many forms, including that of the single-player configuration, whereby a single human user competes against one or more computer-controlled opponents ("AI") ("single-player"); the multi-player configuration, whereby one or more human users compete against one or more other human users ("multi-player"); or a combination of the two configurations, whereby one or more human users compete against any combination of one or more human users or computer-controlled AI opponents. The underlying means by which human users in a multi-player videogame configuration are connected to each other can take a variety of forms, including that of a multi-player local configuration, where two or more human users compete via a single local machine; a multi-player online configuration, where two or more human users compete on separate machines connected via a local area network ("LAN") or wide area network ("WAN") such as the Internet; or a combination of the two. In any configuration, the operability of the multi-player videogame depends upon the timely availability of at least one other human user against or with whom to compete. It therefore follows that, in the situations where a sufficient number of human opponents are unavailable at a given time, multi-player interaction is not possible.

Moreover, as in real life, research has demonstrated that for videogames, when players are not actively competing against other players, they spend time training and practicing in order to improve their skills and thereby become better, more capable competitors. In real life, when a human opponent is unavailable, a player must train in other ways, whether through individual training, through practice against a machine, or through practice against a human proxy. In multi-player videogames, prior to the invention described herein, human players who seek to practice their skills during the time they are not actively competing against other human players, would primarily do so by playing against the computer AI in the single-player videogame configuration.

However, the single-player videogame experience is significantly different from the multi-player videogame experience in a variety of ways. A player's knowledge that he or she is competing against live human opponents is a radically different psychological experience than that of competition against a computer. Further, the behavior, the strategy, and the tendencies of a given computer AI is not exactly the same as that of a human opponent. The computer AI and the human opponent are entirely different entities, and therefore, possess entirely different levels of skill, are affected by different weaknesses, exhibit different tendencies, employ different strategies, and behave and respond in completely different ways when compared to each other. Playing or practicing against a computer is simply not the same experience as playing or practicing against a human. Accordingly, an improved interactive computer system that overcomes such limitations of current videogames and current videogame technology would be desirable.

SUMMARY OF THE INVENTION

The field of the invention relates to interactive computer systems and more particularly to systems and methods for simulating a particular user's behavior in an interactive computer system. In one embodiment, a computer program product includes a simulator configured to simulate a user interacting with a computer program. The simulator includes a learning mode of operation and a simulation mode of operation. During the learning mode, the simulator is configured to monitor the user's interaction with the computer program for one or more events and analyze one or more current circumstances during the occurrence of the one or more events. The simulator is further configured to record one or more user inputs in response to the occurrence of the one or more events, store the one or more user inputs in one or more data fields, and associate the one or more data fields with the one or more events and the one or more current circumstances.

During the simulation mode of operation, the simulator is configured to monitor the computer program for the one or more particular events, retrieve the one or more data fields associated with the one or more particular events, and invoke one or more simulated inputs based on the value of the one or more data fields in response to the occurrence of the one or more events.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIGS. 3*a-b* are processes in accordance with a preferred embodiment of the present invention;

DETAILED DESCRIPTION OF THE PREFERRED EMBODIMENTS

As described above, a user of an interactive computer system configured to have a plurality of users interact with each other, such as a video game system, may desire to compete against another user. However, the ability to compete against another user, especially a particular user, depends upon the availability of that particular user. Further, if the particular user is a superior player, it may be desirable to learn how to defeat such a user without having to play against that particular user in real-time. One approach is to compete against a computer system that simulates the particular user, e.g., a computer system that simulates the particular user's decisions and tendencies.

Figure 1:
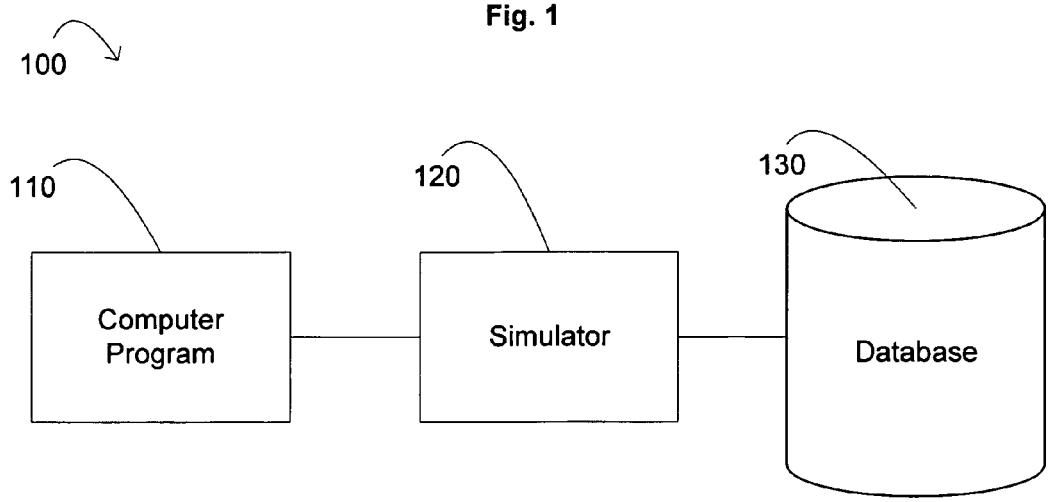
FIG. 1 is a systems diagram of a preferred embodiment of the present invention.

An exemplary embodiment of such a system is shown in FIG. 1. FIG. 1 shows a diagram of an interactive computer system 100 that includes an interactive computer program 110 configured to have a plurality of users interact with each other, such as a video game, a simulator 120 operatively coupled with the program 110 that is configured to simulate a particular user's decisions and behavior, and a database 130 coupled with the simulator 120, which stores data used by the simulator 120 to calculate and generate the decisions and behavior. The simulator 120 generally operates in two modes: (1) learn, or record, mode and (2) simulation, or playback, mode.

Figure 2A:
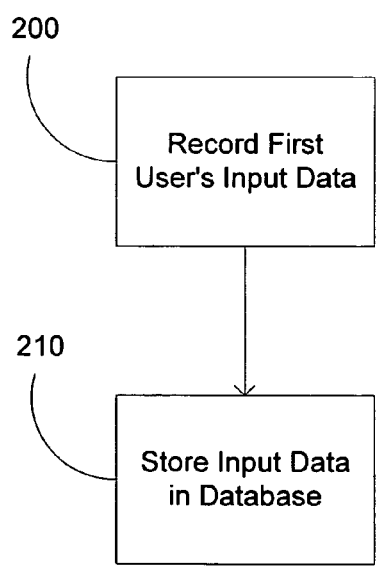
FIGS. 2*a-b* are processes in accordance with a preferred embodiment of the present invention.

Turning to FIG. 2a, a flowchart of the learn mode is shown. During the learn mode, if a first user is using the computer program 110, the simulator 120 collects and evaluates data about the first user's input when interacting with the computer program 110 (action block 200). The collected data is then stored in the database 130 (action block 210). The data is stored in a data structure, generally referred to as a user's profile, corresponding to the first user. Generally, the data is logically linked to an event, or situation, that initiated the user's input.

Figure 2B:
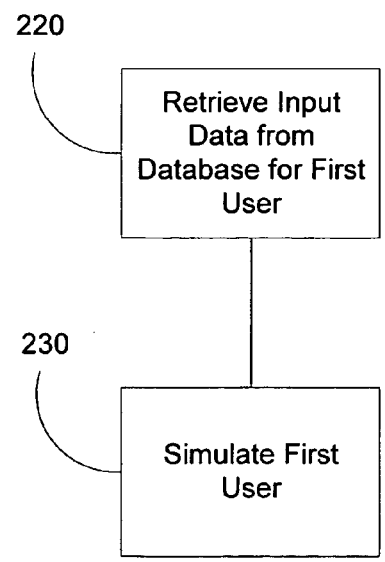

Turning to FIG. 2b, a flowchart of the simulation mode is shown. During simulation mode, if a second user is using the computer program 110 and the second user desires to interact with the first user, but the first user is not available, the simulator 120 will then retrieve input data from the first user, i.e., the first user's profile, from the database 130 (action block 220) and simulate the first user's behavior based on the retrieved data (action block 230).

Turning to FIGS. 3a and 3b, flowcharts of the general operation of a simulator 120 when in learn mode 550 and when in simulation mode 600 are respectively shown. During learning mode 550, as shown in FIG. 3a, the simulator 120 records a user's input as the user is interacting with the game. Preferably, the inputs for a user are stored in data structures herein referred to as user profiles, which may be individual data structures in a database 130. Each user profile has fields or sub-profiles logically associated, or linked, to one or more events and/or situations.

Figure 4:
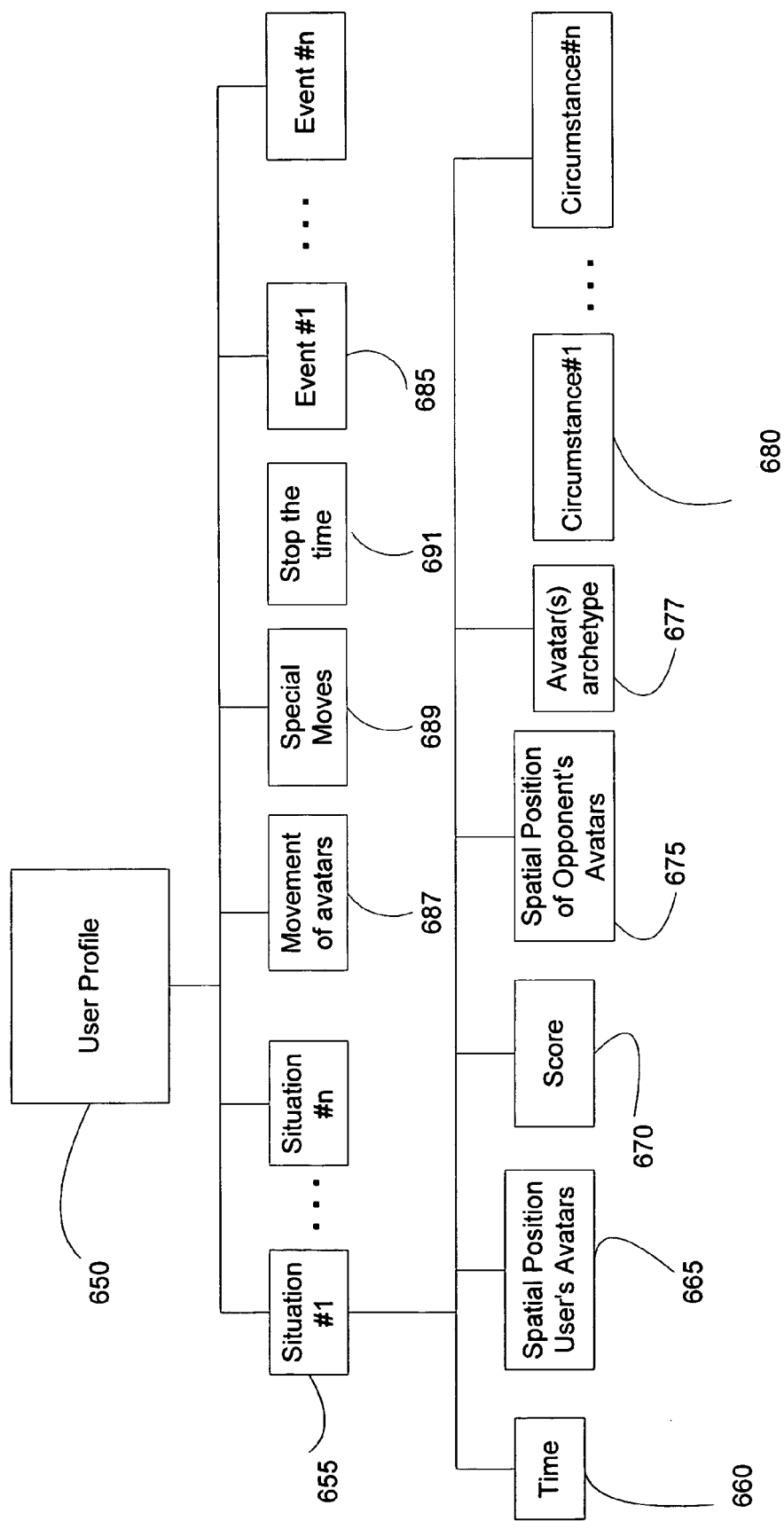
FIG. 4 is a diagram of a user profile in accordance with a preferred embodiment of the present invention.

An example structure of a user profile 650 is shown in FIG. 4. A user profile can contain a sub-profile related to one or more events 685 and/or situations 655 that occur within the computer program 110 during operation. An event 685 is a particular action occurring, whereas a situation 655 is the surrounding circumstances during which an event 685 may take place. For example, in a football game, a situation 655 may be how much time is left in a game or the position of players on the football field, whereas an event may be the quarterback throwing a long bomb or the running back breaking a tackle. Each event 685 and situation 655 are defined by a set of one or more parameters. In the instance where the computer program 110 is a multi-user interactive computer game, wherein each user controls one or more avatars, such as a sports game or a first person shooter game, events 685 and situations 655 may be defined by a number of parameters. One common parameter that defines a situation may be time 660, e.g., time left in a particular session or game, and/or time played in a particular session or game. Another may include spatial position of avatars controlled by the user 665 on the interface screen. For example, in football, the spatial position may be position on a football field, as will be explained in more detail below. In the case of a first person shooter game, spatial position may be location of controlled avatar within the virtual reality of the game. Another parameter may be the spatial position(s) of the avatars controlled by one or more user opponents 675 of the game. Another parameter may be the score if applicable to the computer program 110. For example, the score of a game, e.g., a board game such as chess or a sports game, may trigger a particular type of response by the user. Scores may be based on points or other objective analysis such as opponent players captured, attacking moves made, etc. Another type of parameter, in the case of a computer game involving one or more avatars, is the archetype of the avatar. For example, an archetype can be defined by relative size, strength, and speed. In the case of a basketball game, wherein avatars represent players of the game, archetypes can include true point guard, slasher, shooter, pure shooter, low post scorer, midrange scorer, and role player. One of ordinary skill in the art would also appreciate that other circumstances 680 may be included as parameters, such as virtual weather in games such as golf, or road conditions of racing games. An event 685, as mentioned above, can be defined by a particular action taken place either by a user or by the computer program 110 itself. An action can be movement by an avatar 687, special moves invoked 689, stoppage of time 691, such as a timeout, etc.

During operation, the simulator 120 retrieves, creates, or establishes, a user profile for a particular user interacting with the computer program 110 (action block 552). Next, the simulator 120 monitors and analyzes the user's interaction with the program 110 (action block 555). If the simulator 120 identifies a particular situation and/or event occurring, defined by parameters such as those above (decision block 560), then the simulator 120 will record the user's decision/input, such as a pressed button, combination of buttons, or joystick move of a controller, in response to the particular situation and/or event (action block 565) and store the user's input in the field or sub-profile associated with the particular situation and/or event (action block 570). A user's response to the occurrence of an event can differ depending upon the surrounding circumstances or situation. Thus, the data recorded can be associated with both an event and a situation. In other words, when a user responds to an event, the user's response, when recorded, is not only associated with the occurrence of that event, but also with the situation during the occurrence of that event, which is defined by one or more current circumstances. For example, in the game of basketball, if a user is controlling a basketball player near the three-point line and sees two defenders, one on each side, the user may choose to shoot a jump shot or split the defenders—responses that may be recorded in the profile 650 and linked with opponent's avatar's position. However, the learn mode recognizes that the responses can depend on the situation during which the two defenders are approaching. If the user is losing by a lot of points, then the user may choose to shoot the three pointer instead of split the defenders.

During operation, the simulator 120 will continue this process. The stored data enables the analysis of a user's behavior, tendencies, and inclinations for a given event. Thus, as will be described in more detail below, when the simulator 120 is in simulation mode, and a particular event and/or situation occurs, the simulator 120 can invoke a corresponding reaction based on the stored data, thereby simulating the user.

During simulation, or playback, mode, as shown in FIG. 3b, when a first user desires to interact with a particular second user via the computer program 110, the simulator 120 retrieves the second user's profile (action block 600), if it has been created. Then, the simulator 120 monitors and analyzes the operation of the computer program in search of particular events and/or situations (action block 610). If the simulator 120 identifies the occurrence of a particular event that is linked to a field or sub-profile of the user's profile (decision block 615), then the simulator 120 will check the value of the field or sub-profile (decision block 620). If the response can differ given different situations during the occurrence of the event (decision block 617), then the simulator 120 also analyzes the current situation to determine the proper response (action block 619). For example, in the case of a football game, if the simulated user is on its own twenty yard line and just failed to reach the first down mark after a third down play, e.g., it is fourth down and one, the simulator 120 can analyze the time left on the play clock and the score. If the time left on the play clock is less than two minutes, and simulated user is losing by 5 points, then the simulator 120 will analyze such a situation to determine whether the user would kick a field goal or try to reach the end zone for a touchdown. If there is no value recorded for the given the event and/or situation, then the simulator 120 will generate a random or default response representing the second user's simulated input, or response. If there is a value, (decision block 630) then the simulator 120 will generate a response corresponding to that value, which would represent the second user's response to the occurring situation or event (action block 640), and then continue monitoring (action block 610). If there is more than one value (decision block 630), then the actual second user may have invoked more than one type of response to the particular situation or event while being recorded. In such a case, the simulator 120 can randomly select from one of the values, or the simulator 120 can select its response based on statistics or mathematical formula, e.g., based on the number of times the actual user invoked one response over another (action block 635). Such statistics may indicate tendencies demonstrated by the simulated user.

One of ordinary skill in the art will appreciate that such a system can be applied to any computer system involving multiple users interacting with one another, such as a computer video game. For example, the computer program 110 can be a team sports video game, such as football, basketball, hockey, baseball, etc. In the case of a baseball game, a user profile can contain a field that indicates whether a user will bunt, wherein the field is linked to a situation where there is a player on second base with one out, for example. Other computer programs 110 can include individual sports video games, such as golf, boxing, racing, etc. In the case of a golf game, a user profile can contain a field that indicates the type of golf club used, wherein the field is linked to a situation such as a sand trap. Yet other computer programs 110 can include non sports video games, such as first person shooters, fighting games, board games, etc. In the case of a chess match, a user profile can include a field that indicates when to move the queen, wherein the field is linked to a particular situation. In each of these cases, a user profile can be established with data that enables the analysis and simulation of a particular user. A simulator 120 can be configured to populate a user profile with data, analyze the data, and simulate the user based on the data in accordance with the processes described above.

For example, in the case of a basketball game, an event may be an inbound event, an offensive rebound event, a pass out of shot event, a catch and shoot event, a pump fake event, defensive steal event, and/or a shot event. During learning mode 550, for an inbound event, wherein a team is taking a ball inbound to begin play, the simulator 120 records a user's response to the event. If the user is controlling the team taking the ball inbound, then the simulator 120 records who the inbound was passed; whether the user hurried the inbound, which can be in the form of a quick tap of a control button; whether the user ran an avatar around and then passed, which would indicate a normal inbound; and where the user ended up on the court to start play. During each of these decisions made by the user, the simulator 120 will record the current circumstances, for example, whether the defense is playing a full court press or how much time is left in the game, which may indicate whether a user will hurry the inbound pass. During playback mode 600, when an inbound event occurs, the simulator 120 will retrieve the recorded data associated with the inbound event and also analyze the current situation, such as time, score, and spatial positions of defensive avatars, to determine which action to invoke that represents the simulated user.

For an offensive rebound event, the simulator 120, during learning mode 550, will record which avatar grabbed the rebound and whether the user immediately passed the ball, which indicates a "reset" type rebound, or whether the user shoots the ball, which indicates a "shoot" type rebound. Again, current circumstances are recorded for the event. During playback 600, the simulator 120 will analyze the current circumstances during the occurrence of an offensive rebound event and invoke the proper response accordingly, e.g., whether to invoke a "shoot" rebound or a "reset" rebound.

For a pass out of shot event, the simulator 120, during learn mode 550, records a shot type, which avatar passed, and which avatar was passed to. For current circumstances, the simulator 120 records how open the receiving avatar was and how covered the passing avatar was. During playback 600, for a pass out of shot event, the simulator 120 will analyze how well the passing avatar and the receiving avatar are covered. The simulator 120 will invoke a pass if the current circumstances meet the criteria, e.g., how much the passing and receiving avatars are covered.

For a catch and shoot event, during the learning mode 550, the simulator 120 records how often a user catches and shoots right after the catch and records, as a current circumstance, the location of the user's avatar that catches and shoots. During playback mode 600, the simulator 120 will monitor when the simulated user catches the ball and analyze the simulated user's location on the basketball court. If the simulated user is located in the typical spot for catch and shoot, then the simulator 120 will have the simulated user immediately shoot the ball after the catch.

For a pump fake event, during the learning mode 550, the simulator 120 records how often a user pump fakes. For current circumstances, the simulator 120 records how covered the user was and user's location. During playback mode 600, the simulator 120 will monitor for a shoot event and analyze the location of the simulated user and the defensive coverage. If criteria is met, then simulator 120 will invoke a pump fake.

For a defensive steal event, the simulator 120, during learning mode 550, records how often a user attempts to steal and the average time between attempts. As current circumstances, the simulator 120 records the user's distance to the ball, number of fouls to give in a quarter, and the skill level of the avatar with the ball. During playback mode 600, whenever an opponent has the ball and is at or below a typical skill level that the simulated user is willing to attempt a steal on, the simulated user's avatar is close enough to the ball handler, the last time a steal attempt was made is greater than the average recorded time between attempts, and there are enough fouls for the simulated user to give, then a steal is attempted.

For shot timing, during the learning mode 550, the simulator 120 records how well the shot was timed for each shot type, e.g., jump shot, bank shot, etc. During playback mode 600, the simulated user's release shot is timed based on recorded data.

In addition to the current circumstances above, another circumstance that can define a situation and effect the simulated user's response is the archetype of the avatar(s), e.g., whether the avatar is a true point guard, a slasher, a shooter, a pure shooter, a low post shooter, a midrange shooter, and role player. For each event, during learning mode 550, the simulator 120 records the archetype of the avatar that initiated a monitored event. Other circumstances include the spatial location of the event, time on the shot clock, duration of the event, and how many teammates were available to participate.

The simulator 120 provides a means for players to engage in any possible configuration of multi-player game play at any time, regardless of the availability of another human opponent. It further enables a user to be able to practice against and develop skills against one or more specific human opponents at any time, regardless of whether the actual human opponent is physically present or connected, or not. It also enables a user to be able to simulate the unique, individual behaviors, weaknesses, strategies and tendencies of actual human opponents within a videogame, thereby blurring the line that differentiates human opponents and computer AI, and the resulting interactive experience of the two.

Another example embodiment of a computer system 100 is a video game system that simulates an American football game and enables a first user to play the game against a computer opponent or a second user, and which is embodied in Visual Concepts' ESPN NFL 2K5™ ("NFL 2K5") video game, a product currently available in the market. NFL 2K5 includes a computer program 110 in the form of an video game to be executed on a video game console, such as Microsoft's Xbox® or Sony's Playstation 2®, which includes a user input device, typically referred to as a game controller (not shown).

Figure 5:
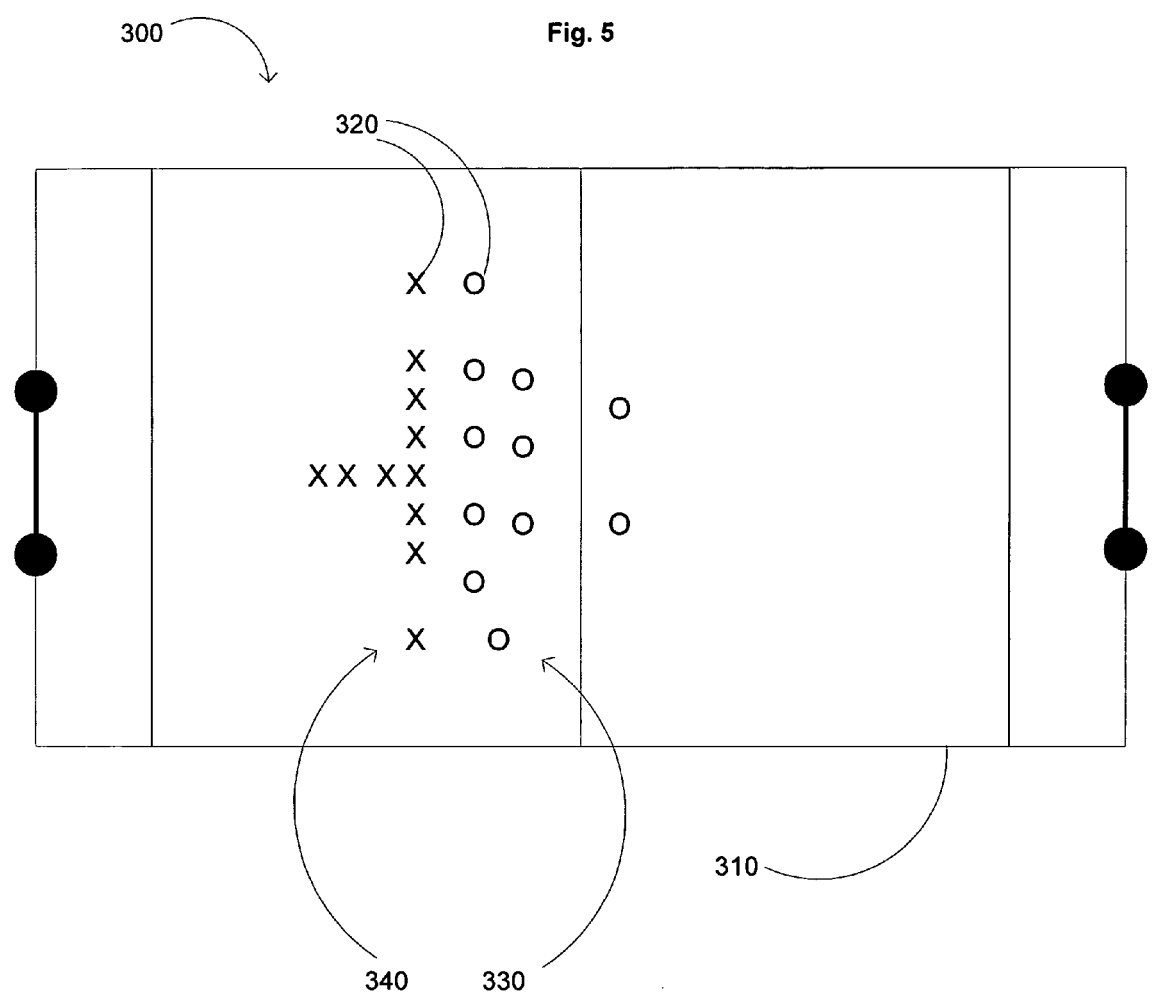
FIG. 5 is a diagram of a computer video game interface.

Turning to FIG. 5, a diagram representing a video game interface 300 is shown. The interface 300 generally includes a graphical representation of a football field 310, and two sets of avatars 320, each representing a football team set to oppose each other. One of the sets of avatars 320 represent a defensive team, or team on defense 330, wherein each avatar 320 represents a defensive player, i.e., defensive linemen, linebackers, and defensive backs. The other set of avatars 320 represents an offensive team, or team on offense 340, wherein each avatar 320 represents an offensive player, i.e., offensive linemen, backs, receivers, and a quarterback.

At a state before any action begins, which is commonly referred to as the "pre-snap" state, the user's input generally includes the choice of a formation from among a set of pre-defined choices, i.e., the position of the respective avatars 320 on the representative football field 310, and the user's input further includes the choice of a play from among a set of pre-defined choices, which defines a route for each avatar 320, i.e., how each avatar 320 will move when action begins and when the user is not controlling that avatar 320, in accordance with the general rules of American football. These choices are commonly referred to as play calling.

When action begins, which is commonly referred to as the "post-snap" state, the avatars 320 move in accordance to the choices made by the user during the "pre-snap" state, and the user's input generally includes controlling the movements and actions of one or more of the avatars 320. Thus, skill in this game generally depends upon the user's ability to make the appropriate choices during the pre-snap state and the ability to control one or more avatars 320 during the post-snap state.

A first user controls one of the teams 330/340. The other of the teams 330/340 may be controlled by the computer program 110 or by a second user. In addition, the other of the teams 330/340 may be controlled by a simulator 120, which includes a learning mode and a simulation mode.

Figure 6:
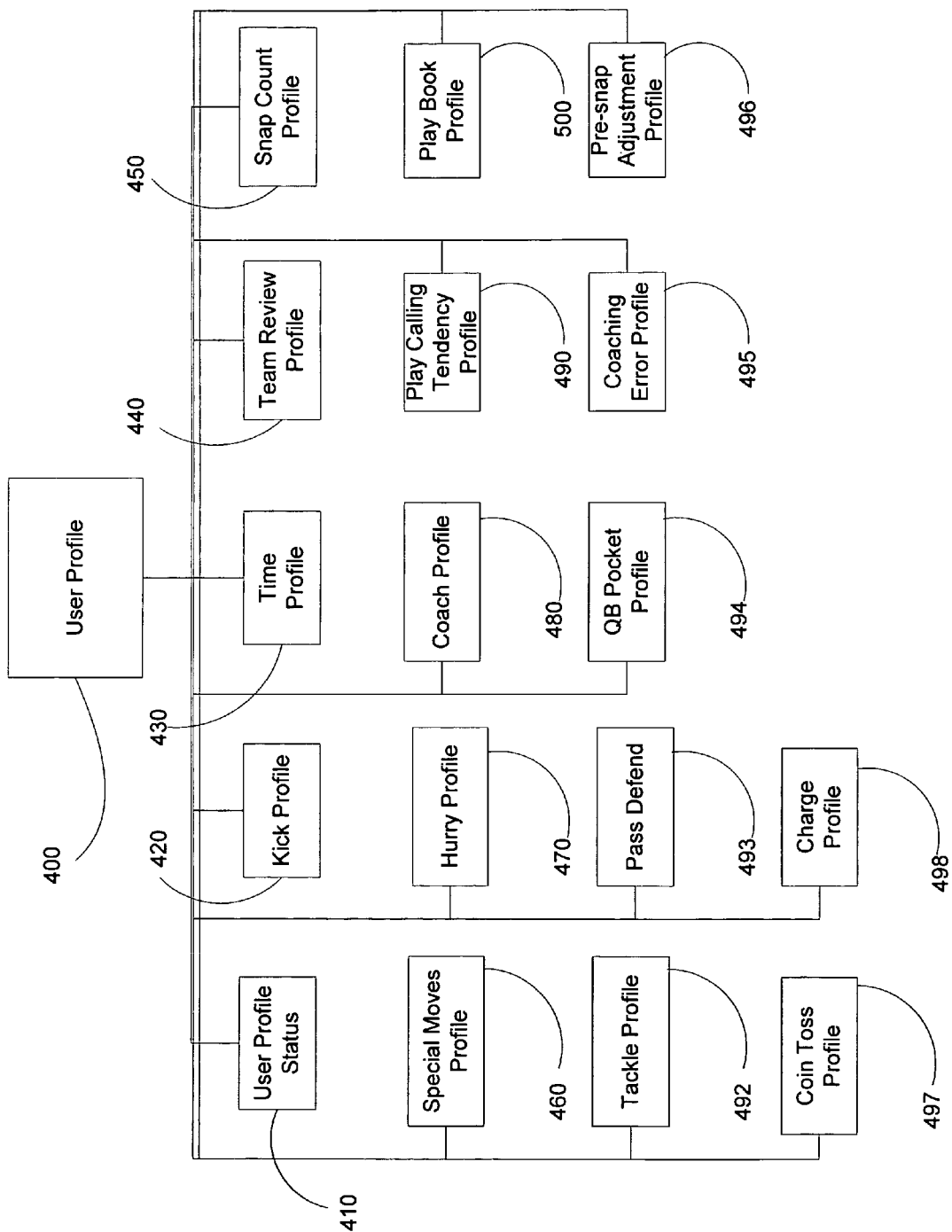
FIG. 6 is a data structure in accordance with a preferred embodiment of the present invention.

During learning mode, the simulator 120 records a user's input as the user is interacting with the game. Turning to FIG. 6, the inputs for a user are stored in user profiles 400, which, as described above, may be individual data structures in a database 130. The general structure of a user profile 400 for this particular video game is shown in FIG. 6. A user profile includes sub-profiles, e.g., 410, each containing fields or additional sub profiles that store the user's inputs in an organized and logical manner. Generally, as mentioned above, the user's input is logically linked to an event and/or situation that initiated the user's input. For example, in the case of NFL 2K5, a pre-snap state can define a situation established by current circumstances, such as the score and spatial location on the football field, e.g., the user's team being down 21 points against an opponent, and the user's offense is on the football field on its own 25 yard line in the middle of the fourth quarter. Current circumstances can also include the spatial location of individual avatars, such as the linebacker or defensive back. A post-snap event can be a user controlling the quarterback, and the opponent is blitzing. As mentioned above, the response to a post-snap event may depend upon the situation, e.g., the pre-snap state. Therefore, not only is the occurrence of the event identified, but one or more current circumstances during the occurrence of the event are analyzed and stored also. Generally, a user profile 400 for each user is created and stored in the database 130 and managed and controlled by the simulator 120.

The stored data enables the analysis of a user's behavior, tendencies, and inclinations for a given event and situation. Thus, as will be described in more detail below and as mentioned above, when the simulator 120 is in simulation mode, and a particular event occurs, the simulator 120 may invoke a corresponding reaction based on the stored data.

Figure 7:
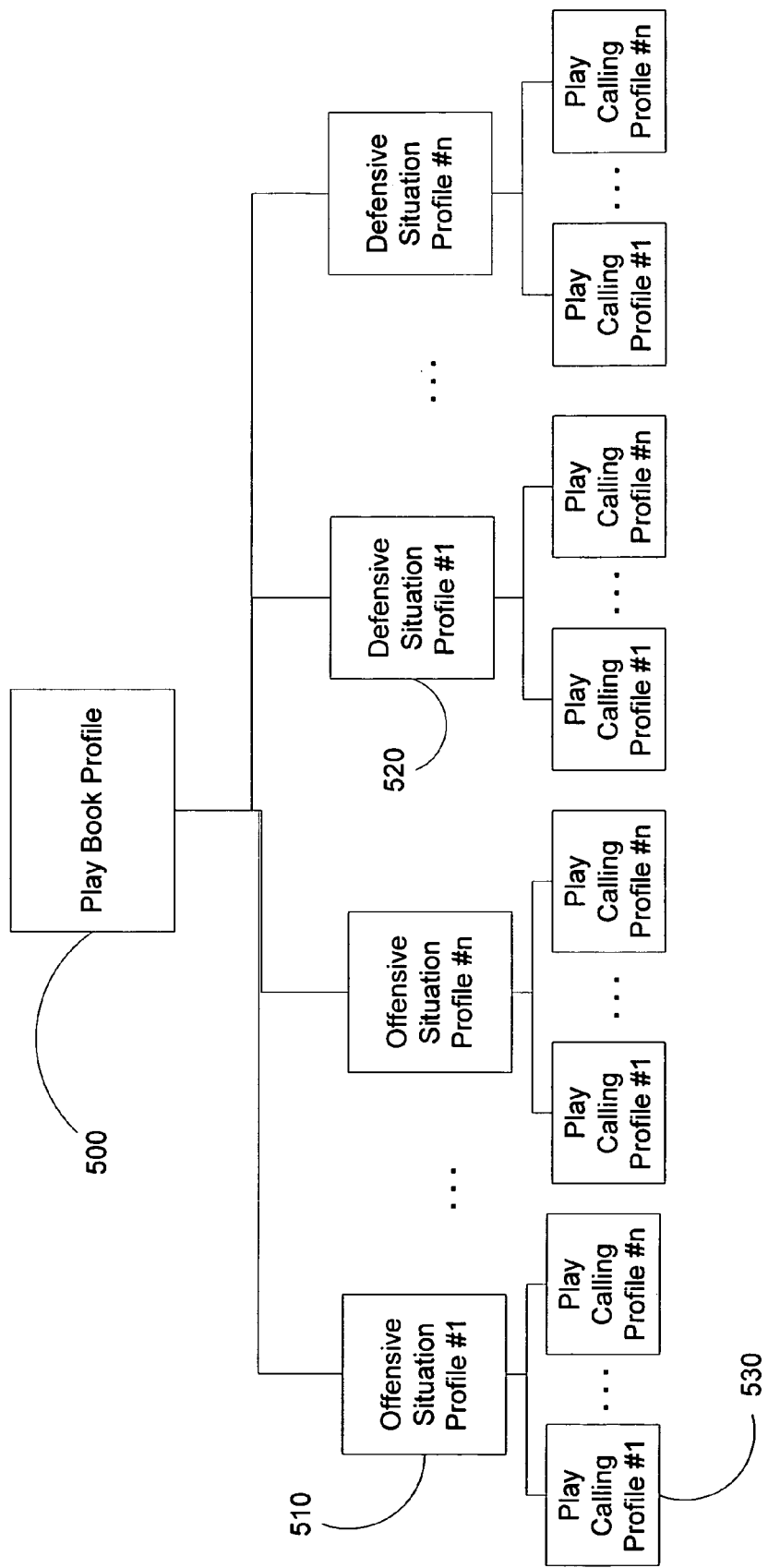
FIG. 7 is a data structure in accordance with a preferred embodiment of the present invention.

A number of the sub-profiles, e.g., 410, will now be described. Turning to FIG. 7, the data structure for a play book profile 500 is shown. As shown in FIG. 6, a play book profile 500 is a sub-profile of a user profile 400 that generally includes a history of a user's play calling choices in response to particular events and situations. A user's profile can include one or more play book profiles 500. A play book profile 500 includes a plurality of offensive and defensive situation profiles 510 that include a plurality of play calling profiles 530. Preferably, a situation is generally defined by the down, distance, position on the field, the score, the time in the game, and the plays called by the opposing team. A play calling profile 530 stores information about the user's choice of play and the choices made within the play. Preferably, the key pieces of information stored in a play calling profile is the formation and play.

Figure 8A:
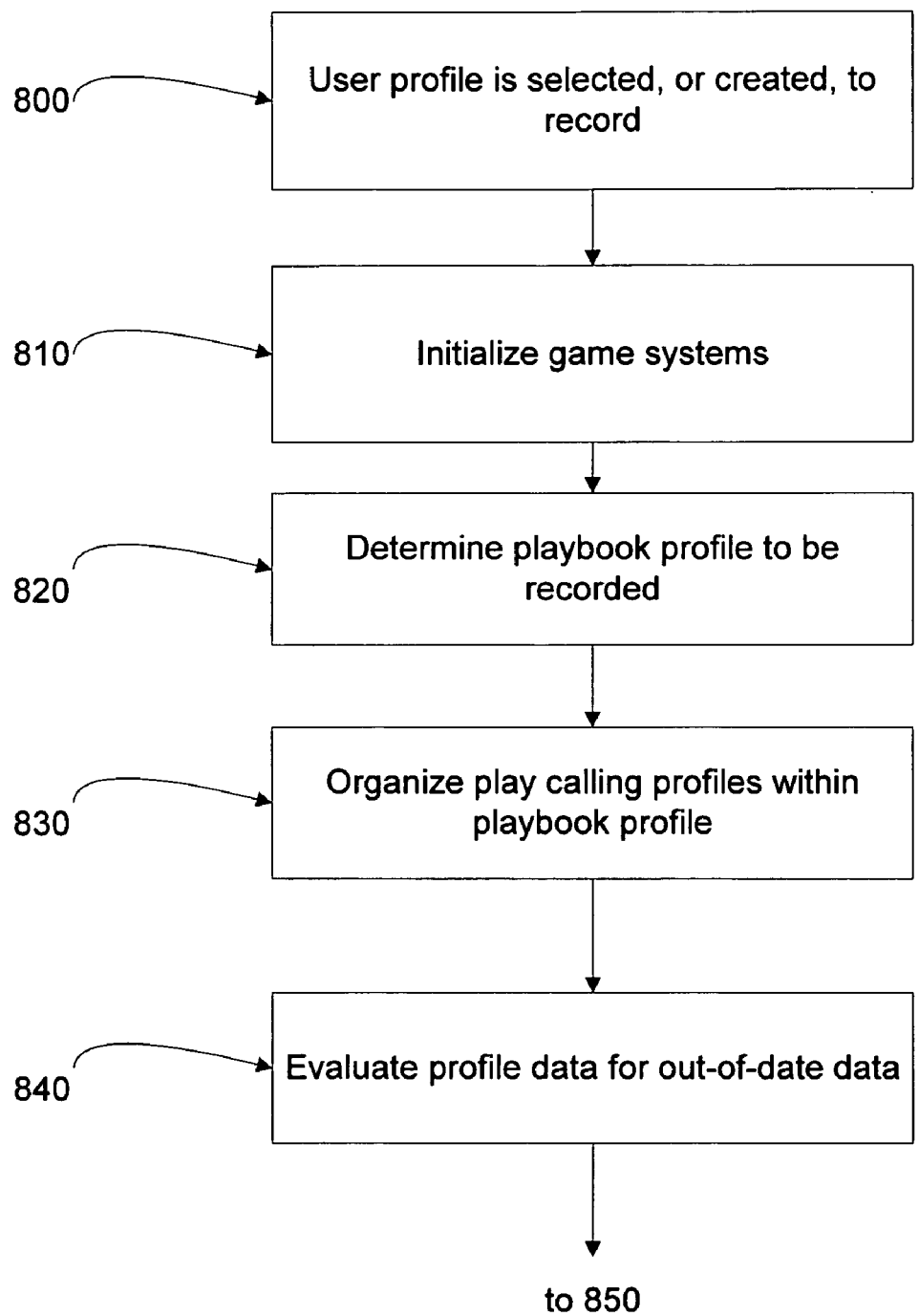
FIGS. 8a-c is a process in accordance with a preferred embodiment of the present invention.
Figure 8B:
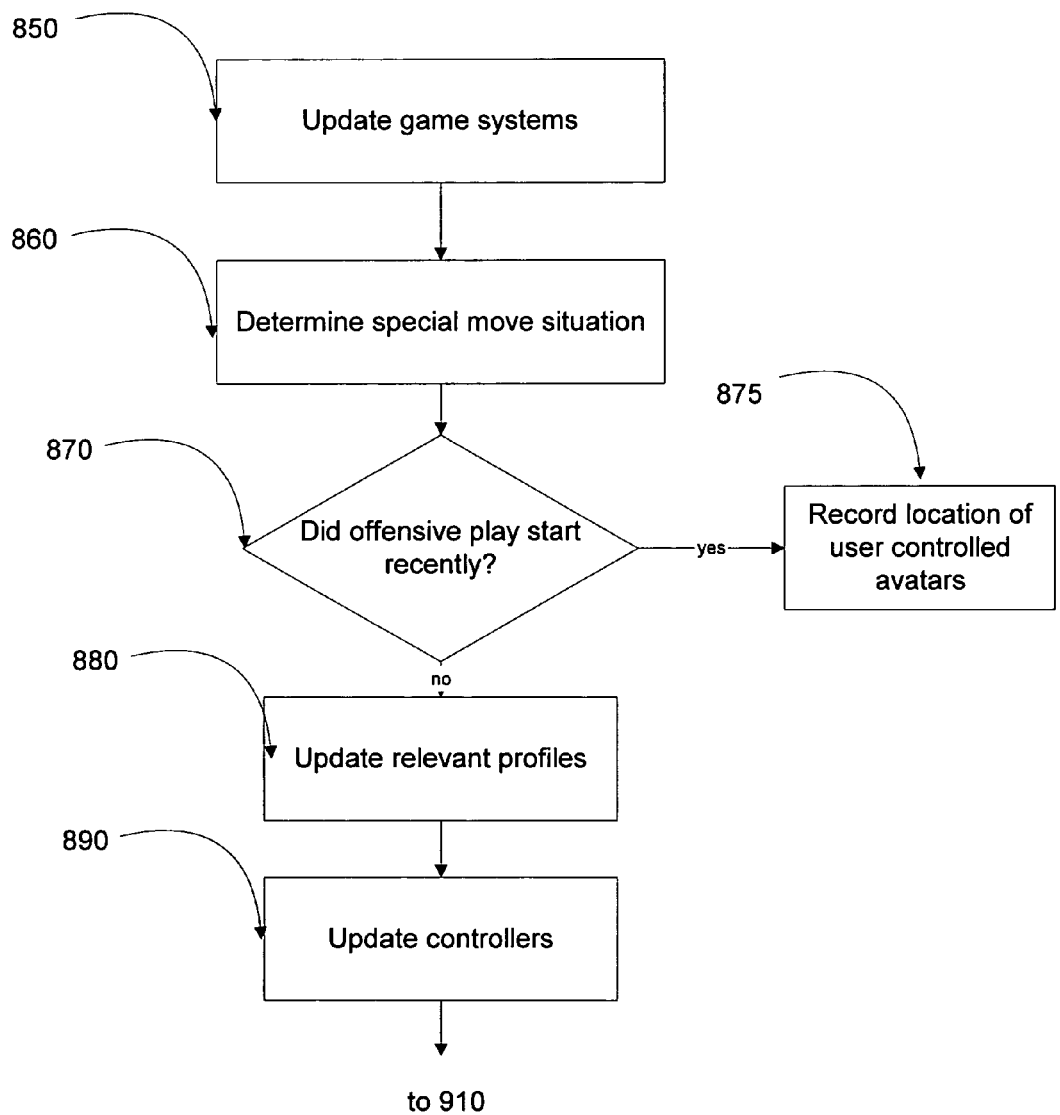
Figure 8C:
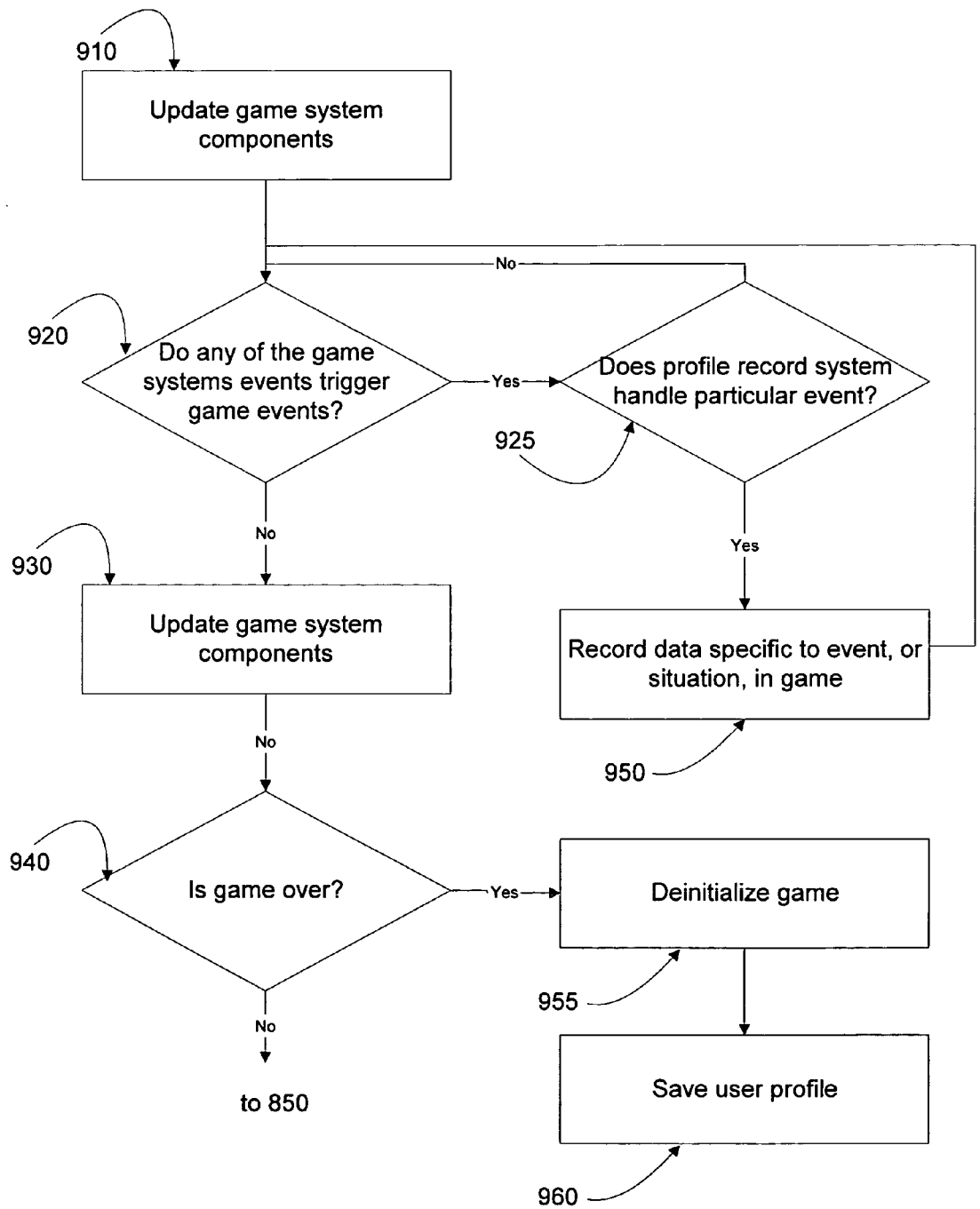
Figure 9A:
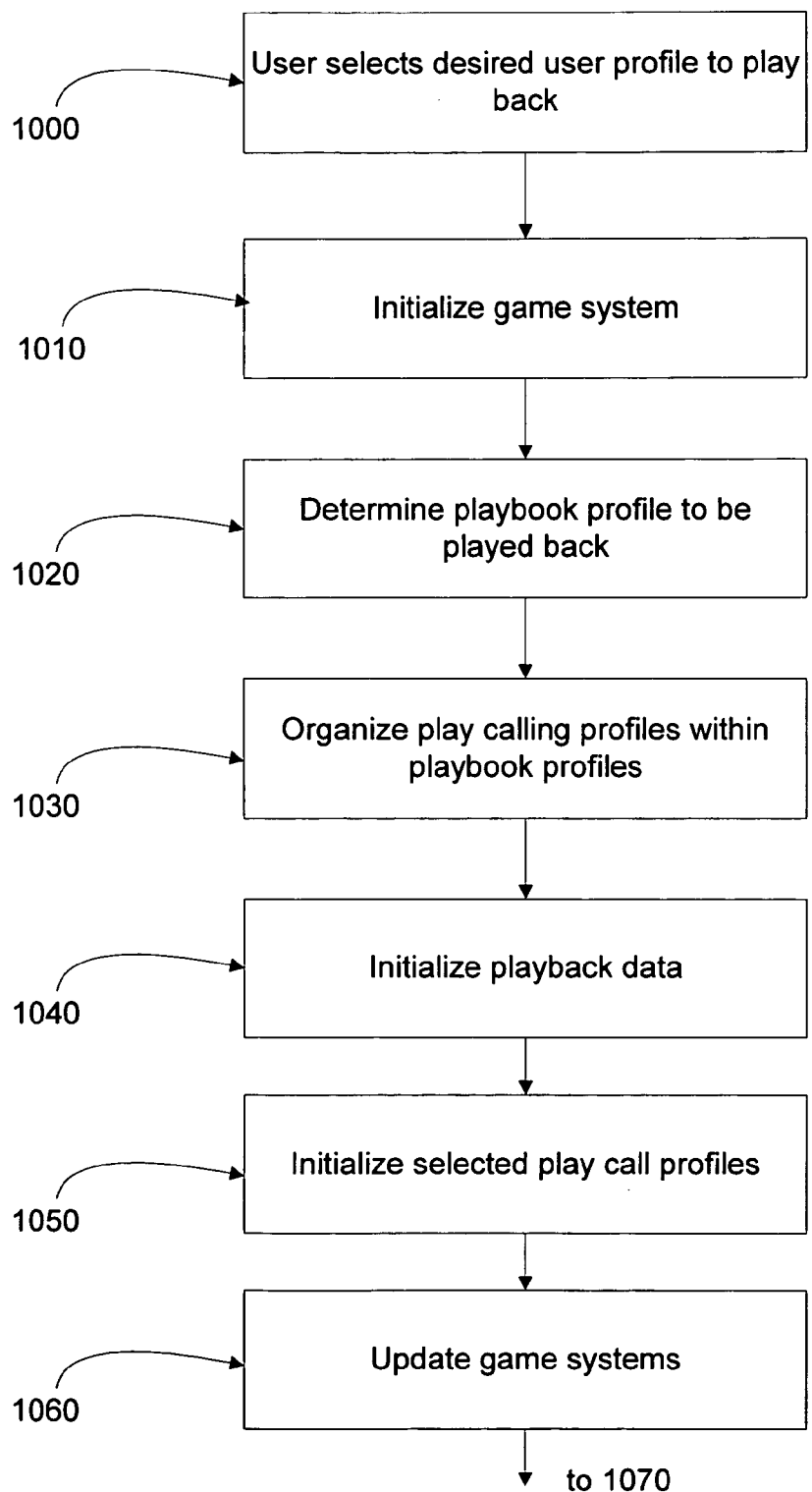
FIGS. 9a-d is a process in accordance with a preferred embodiment of the present invention.
Figure 9B:
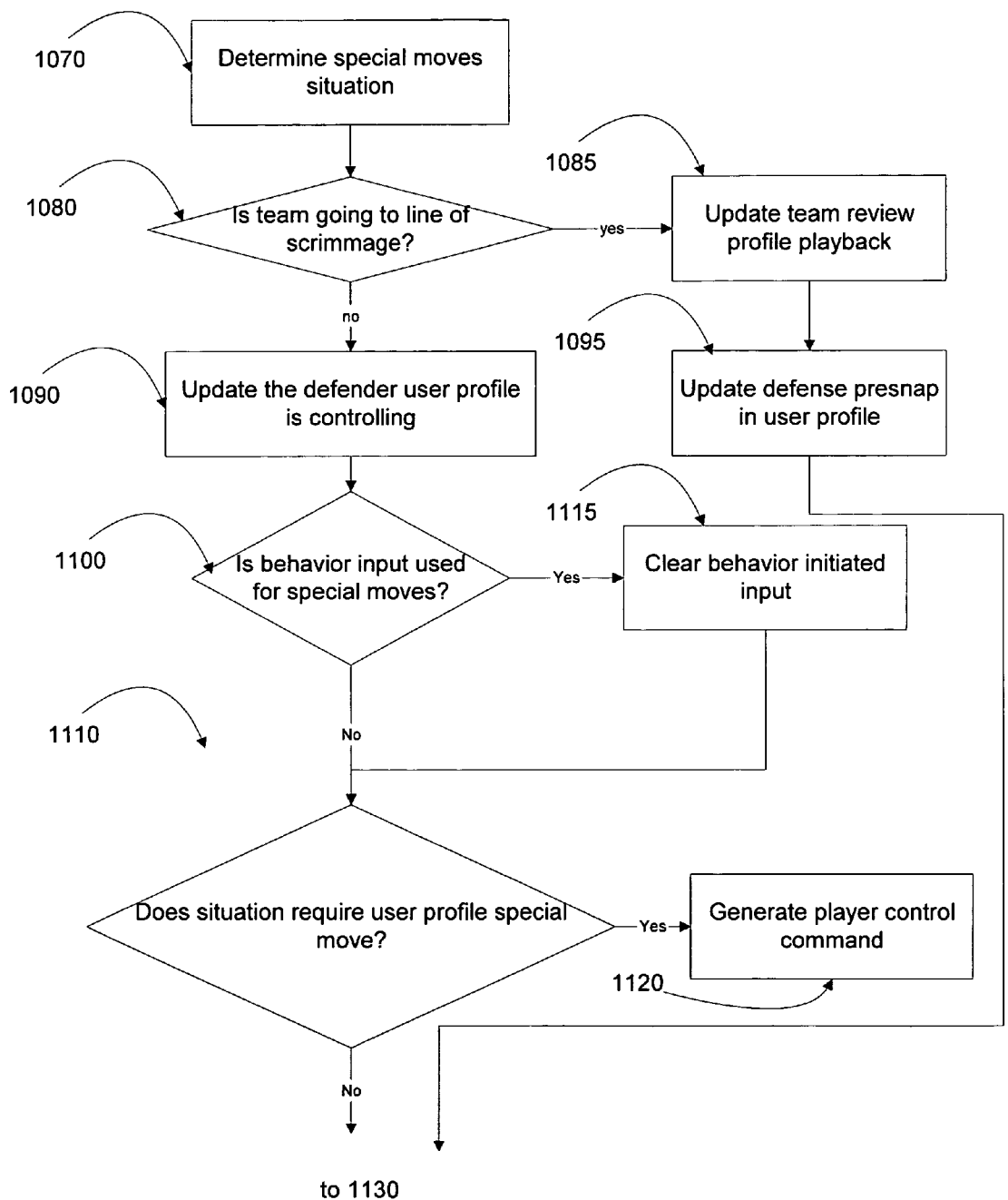
Figure 9C:
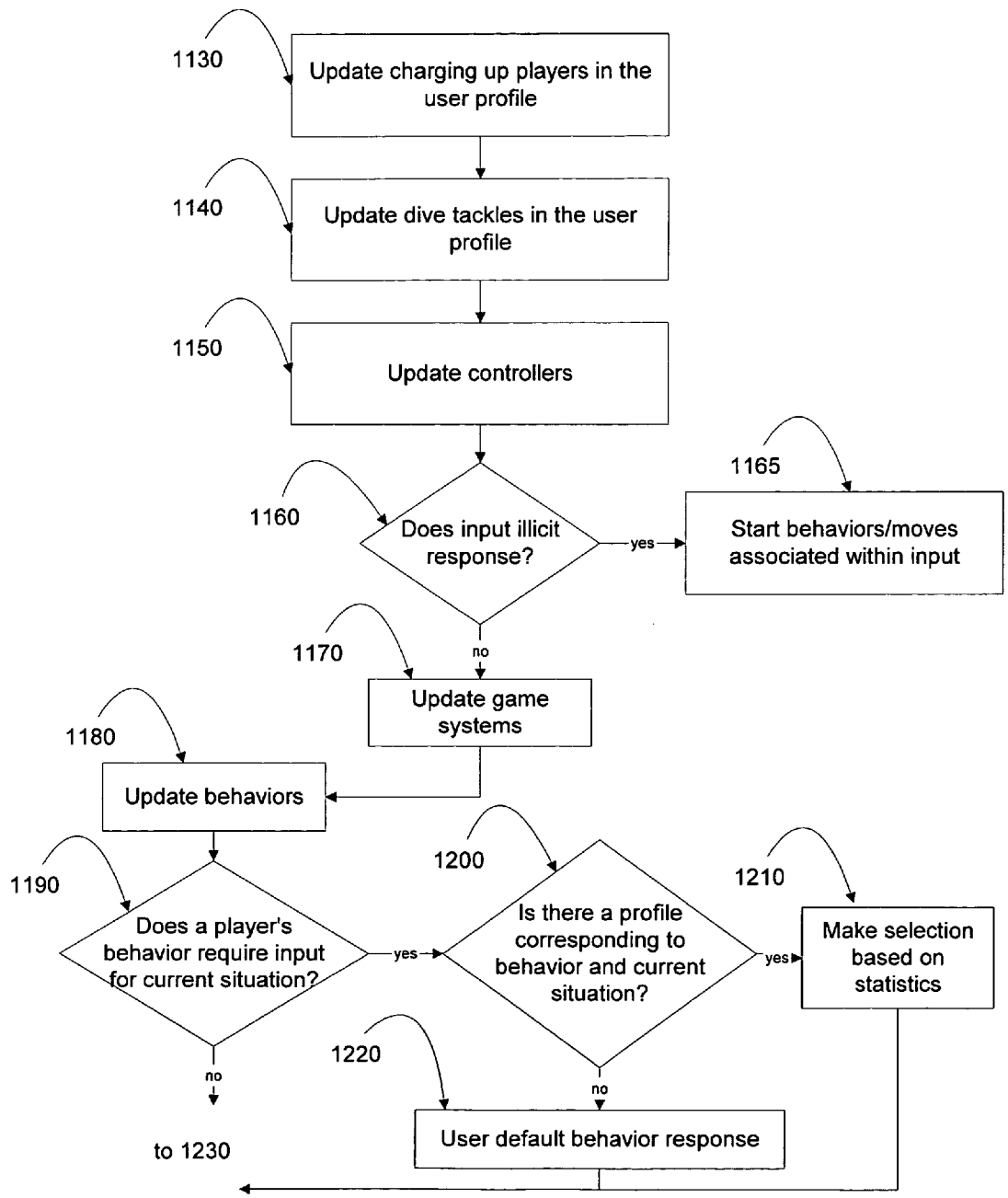
Figure 9D:
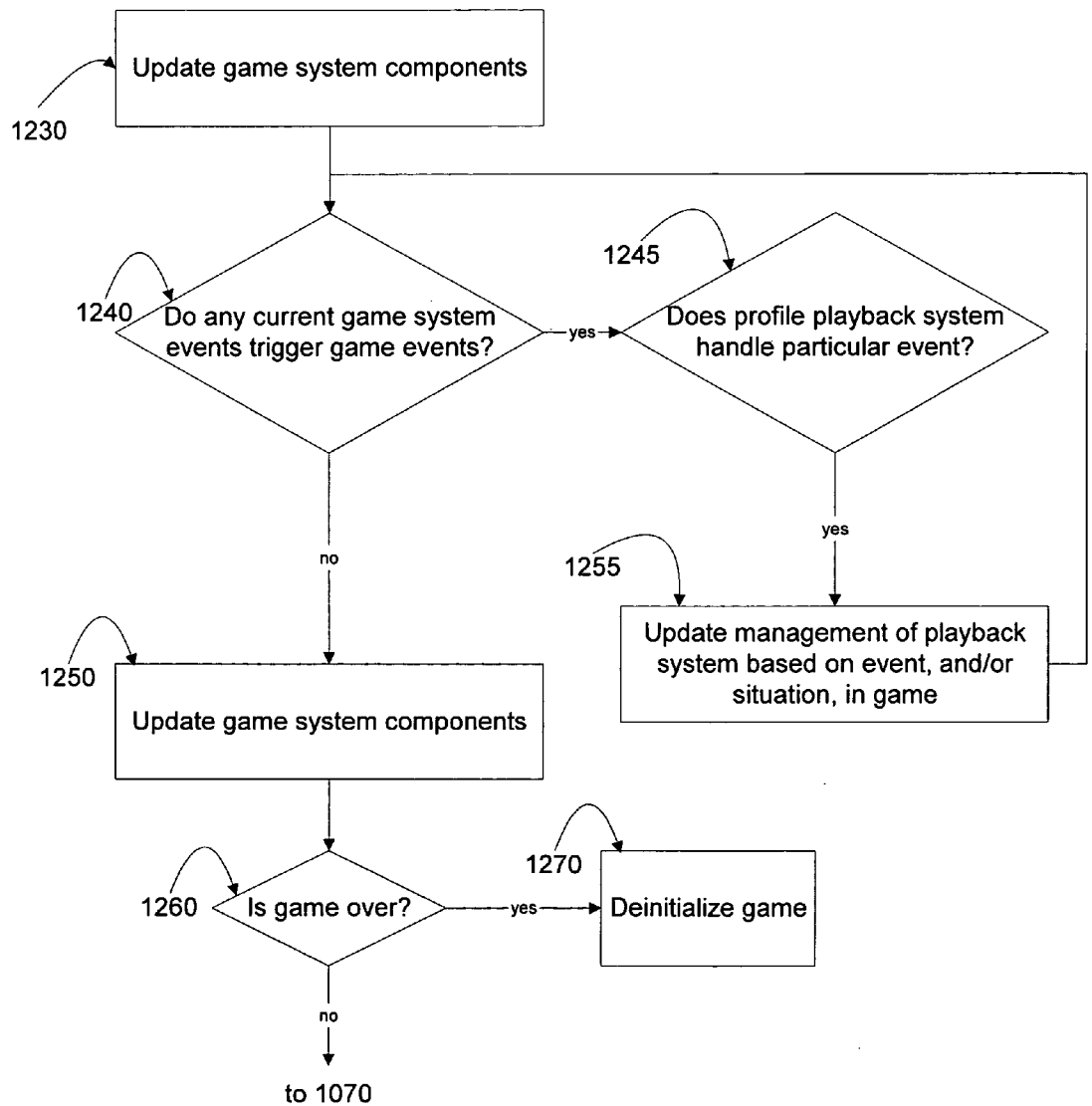

The operation of the learning mode of the simulator 120 for the American football computer system 100 is shown in FIGS. 8*a-c*. During learning mode, the simulator 120 retrieves the user profile 400 of the user to be simulated (action block 800). The computer system initializes the game system features, e.g., controllers, animations, collisions, behaviors, etc. (action block 810). Next, the simulator 120 determines the play book profile 500 to be recorded corresponding to the user (action block 820). The simulator 120 next organizes the play calling profiles 530 within the playbook profile 500 (action block 830). If there is existing data in the playbook profile 500, then the simulator 120 will evaluate whether the data is up to date (action block 840). Preferably, data should evolve as the user's interaction evolves. In other words, data recorded thirty games ago may have a lesser impact on the total data available.

After the game starts, and the game system components are updated, e.g., clocks, teams, cameras, etc. (action block 850), the simulator 120 monitors to determine whether a situation for special moves has occurred (action block 860). If the user is playing offense and an offensive play has started (decision block 870), then the simulator 120 will record the location of the user controlled avatars, such as the quarterback or running back (action block 875). Otherwise, the simulator 120 will record data into relevant profiles (action block 880). Next, the simulator 120 will control the user's input via the game controller (action block 890).

After the game system components are updated, e.g., behaviors, moves, animation, etc. (action block 910), the simulator 120 next determines if any of the game system events, such as animations, trigger actual game events (decision block 920). If so, if a profile handles such a game system event (decision block 925), then the simulator 120 will record the game system event (action block 950). If not, then the game system continues, and the components are updated, e.g., roster data, sound effects, crowd, statistics (action block 930). Upon completion of the game (decision block 940), the game is deinitialized (action block 955), and the user profile will be saved (action block 960).

The operation of the play back mode is illustrated in FIGS. 9*a-d*. A user first selects the opponent to be simulated, and thus, selects the corresponding user profile to play back (action block 1000). After the system initializes, e.g., controllers, animations, behaviors, etc. (action block 1010), the simulator 120 then determines the appropriate playbook profile 500 to use (action block 1020) and then organizes the play calling profiles 520 within the playbook profile (action block 1030). The simulator 120 then initializes the playback data (action block 1040) and initializes selected play call profiles 520 (action block 1050). The game system is then updated, e.g., clocks, teams, coaching decisions, cameras, etc. (action block 1060). While the computer program 110 is running, the simulator 120 monitors the program to identify events or situations that may warrant a special move (action block 1070). The simulator 120 then monitors to determine if a team is approaching the line of scrimmage (decision block 1080). If so, then the simulator 120 updates the team review profile 440 (action block 1085) and updates defense pre-snap 496 in user profile (action block 1095). If not, then the simulator updates the defender that the user profile 400 is controlling (action block 1090).

The simulator 120 then evaluates whether behavior input is used for special moves (decision block 1100). If so, then the simulator 120 clears the behavior initiated input (action block 1115). The simulator 120 then determines whether current situation requires a user profile 400 special move (decision block 1110). If so, then the simulator 120 generates a player control command for the computer program 110 (action block 1120). The simulator 120 then charges up appropriate avatars based on information in the user profile 400 (action block 1130) and updates dive tackles in the user profile 400 (action block 1140). The simulator 120 will then generate controller data representing the user (action block 1150).

The simulator 120 then determines whether the input data will illicit some behavior or response (decision block 1160). If so, then the program will start the behaviors/moves associated with the input (action block 1165). If not, game system components, such as reference data, is updated (action block 1170) and then the behaviors are updated (action block 1180). Next, whether input is required for a player's behavior in the current situation (decision block 1190). If so, then the simulator 120 determines whether there is data that corresponds to the behavior or current situation (decision block 1200). If so, then the behavior is invoke. If there is more than one behavior recorded, the selection is based on statistical data (action block 1210). The selection returns input command to be used by the behaviors. If not, then default behavior or response is chosen (action block 1220).

After the game system components are updated, e.g., moves, animations, physics/collisions (action block 1230), the simulator 120 then determines whether any current game system events, such as animations or collisions, trigger game events (decision block 1240). If so, then the simulator 120 searches for a profile playback system that handles this event (decision block 1245). If so, then the simulator 120 updates the management of the playback system based on the event in the game (action block 1255). If not, then game system components are updated, e.g., roster data, sound effects, crowd, and statistics (action block 1250). When the game ends (decision block 1260), the game is deinitialized (action block 1270).

To illustrate the operation, if the user is playing offense and is on its own goal line, 2nd and goal, up by 21 points in the middle of the fourth quarter, then the simulator 120 will retrieve the corresponding offensive situation profile 510. If the user in that situation selects the "I" formation and then selects a run play with the half-back assigned to run between the right guard and tackle, those choices are stored in a play calling profile 530 for the corresponding offensive situation profile 510. Likewise, if the user is playing defense in that same situation, the simulator 120 will retrieve the corresponding defensive situation profile 520. If the user selects a goal line formation with all the avatars 320 blitzing, such information is stored in a play calling profile 530 for the corresponding defensive situation profile 520. Further, the simulator 120 may compare the defensive situation with the actual formation the offense uses, which may not be an expected formation. The defensive situation profile 520 may include information as to whether a user may react to an unexpected formation. For example, an offensive situation may be 3rd down and 10 yards to go. In such a situation, the defense would expect to see an offensive formation with more than two wide receivers. However, the actual offensive formation may be one wide receiver, a full back, and a tight end (large formation). In such a case, the defensive situation profile 520 may include recorded responses by the user, such as calling a run defense, calling the base personal in a 4-3, or maintaining a pass defense, such as a nickel or dime.

Other information to be stored may include how the formation and play are used by the user. For example, for an offensive play calling profile 530, information may include whether the user motions avatars 320 for a play and which avatar is motioned. For a pass play, which receiver is passed to, what hot routes are called, and whether the QB pump fakes. Other information includes where the QB or the running back initially moves to after the ball is snapped, how hard the QB throws the ball, when the QB does throw the ball, and what circumstances cause the user to flip a play.

For a defensive play calling profile 530, the simulator 120 may store whether and how a user adjusts defensive players for a particular play, which avatar 320 the user typically controls, and where the user typically lines up the avatars 320. Other information may include when the user blitzes, what defensive adjustments are made (linemen shift, linebacker shift, and defensive back adjustments), and whether the user makes adjustments to double team the best receiver on the opposing team.

A user may call more than one formation and/or play for a given situation. Thus, a situation profile 510/520 may include more than one play calling profile, each with different selections made by the user. If a user varies in selection but does make a particular selection more frequently than others, such statistical data may be stored in the play calling profiles 530 as well. As will be described in more detail below, when the simulator 120 is in simulation mode, when the simulator 120 retrieves the corresponding situation profile 510/520, if a situation profile 510/520 includes more than one play calling profile 530, a play calling profile 530 may be selected randomly or based on available statistical data.

Turning to FIG. 6, a kick profile 420 stores information as to how well a user kicks the ball during play. This includes how many times a user has kicked the ball, the minimum and maximum distances that a user has kicked the ball, and the total power used. There is a kick profile for when a user kicks off, punts, and kicks field goals. When recording data for a kick profile 420, the simulator 120 may check to see if the user's power has exceeded the minimum or maximum, increment the kick count, and add the power to the total power accumulated. When the simulator 120 is in simulation mode, based on the user's profile 400, and the simulated user is in a kick situation, the simulator 120 may determine the power for kick based on the corresponding kick profile 420, e.g., whether the power should be above the average or below the average and/or whether the power should be a random value between the maximum and minimum powers recorded. If this value is above the average, then the simulator 120 may randomly select a value between the minimum power and the average. If this value is below the average, then the simulator 120 can randomly select a value between the average and the maximum power.

Another sub-profile that can be included is the special moves profile 460. A user can invoke special moves if the user's avatars 320 are in possession of the ball. In such a situation, the simulator 120 may examine where the closest two defending avatars 320 are in relation to the ball carrying avatar 320 ("the ball carrier") on the football field 310. In one approach, the simulator 120 defines a logical grid of two rows and three columns on the football field 310 in front of the ball carrier. If one of the two closest defending avatars 320 is within one of the defined locations, then the simulator 120 records such information by setting a bit in an index within the special moves profile 460 to indicate this. The simulator 120 further defines a logical half circle behind the ball carrier on the football field 310. If one of the two closest defending avatars 320 is in this area, the simulator 120 sets a bit in an index in the special moves profile 460 to indicate this as well. A table can be created within the special moves profile 460 of how much time a user has spent in this situation, how often a user selected an available turbo button in this situation, and how many times the user has invoked any of the available number of different special moves in this situation. As with the play book profile 500, this information may be categorized based on different situations.

When a ball carrier is in a known situation, the simulator 120 can increment the time spent in this situation. When the appropriate situation profile is retrieved, the simulator 120 may store whether a special move was invoked, what special move was invoked, and whether the user selected an available turbo button. During simulation mode, the simulator 120 retrieves the special moves profile 460, determines when the last time the user invoked a special move or hit a turbo button, evaluates special moves recorded in the profile 460, and determines whether a special move should be invoked, what the special move should be, and whether to initiate the turbo button option. The type of special move can be selected randomly and/or based on the frequency of the recorded selections of certain types of special moves.

Other sub-profiles include tackle profile 492, which stores the types of tackles the user prefers; pass defend profile 493, which stores the user's preference in defending passes thrown to the receiver the user is covering; QB pocket profile 494, which stores the tendencies the user has when controlling the quarterback in the pocket, e.g., whether the user likes to scramble, pump fake, evade, etc.; coaching error profile 495, which stores the types of mistakes the user makes for "head coach" decisions, such as inappropriately going for two points; pre-snap adjustment profile 496, which stores the types of adjustments the user prefers to make at the line of scrimmage; coin toss profile 497, which stores the decisions the user prefers to make during the coin toss; charge profile 498, which stores when and how often a users prefers to "charge up" the controlled avatar; and play calling tendency profile 490, which stores a group of information indicating how often a user uses coaches pick and audibles and whether the user calls a defensive play without knowing what offensive package will be used on the field.

If a first user desires to play the video game against a simulation of a particular second user, the simulator 120 may operate in simulation mode and retrieve the second user's profile 400 from the database 130 of profiles in accordance with process shown in FIG. 3 and described above.

The following is a detailed list of profiles stored in a user profile 400 and the type of information that may be stored within the respective profiles:
USER_PROFILE 400

| | |
|---|---|
| doDiveTackle | Whether to dive tackle at next tackle opportunity |
| checkDefenseSwap | Determine which defender the user is controlling |
| chargeUp | Whether turbo meter is charging up |
| chargeUpThisPlay | Whether to test for charging up turbo meter on current play |
| usePlaybook | Whether to record and play back play call data |
| trainerIntroDone | Whether VIP trainer has been explained to user |

-continued

| | |
|---|---|
| userName | Name of the user who created this profile |
| playbookProfiles | |
| currentPlaybookProfile | The current PLAYBOOK_PROFILE in use by the user |
| currentOffensiveSituation | What is the current situation being profiled? |
| currentDefensiveSituation | What is the current situation being profiled? |
| currentOffensivePlaycallProfile | Which play call profiles are being used on the current offense play? (See OFFENSIVE_PLAYCALL_PROFILE) |
| currentDefensivePlaycallProfile | Which play call profiles are being used on the current defense play? (See DEFENSIVE_PLAYCALL_PROFILE) |
| passPlaysStarted | How many times did the user hike the ball with a pass play called? |
| numberOffensePlaysStarted | How many times was user on offense? |
| numberDefensePlaysStarted | How many times was user on defense? |
| numberOffensivePlaysCalled | Number of opportunities to call coaches pick on offense |
| numberOffensiveCoachesPick | Number of times coaches pick actually used |
| numberDefensivePlaysCalled | Number of opportunities to call coaches pick or audibles on defense |
| numberDefensiveCoachesPick | Number of times coaches pick actually used |
| numberDefensiveNonWaitCalls | Number of times play on defense was called before package offense was noticed |
| numberDefensiveAudibles | How many times was a defensive audible being called? |
| numberOffensiveAudibles | How many times was an offensive audible called? |
| pumpFake | How often does user use pump fake to get players open? |
| passThrownAway | Of the number of pass plays, number of balls thrown away? |
| scrambleCount | Of the number of pass plays, number of scrambles? |
| escapeMoves | How often does user use various defensive escape moves? |
| wrapTackle | How many times did user do non dive tackle? |
| diveTackle | How many times did user do dive tackle? |
| numberDefenseSwapPlays | How many plays did user change which defender they were are play started? |
| numberDefenseChargePlays | Number of plays charged up on defense |
| numberOffenseChargePlays | Number of plays charged up on defense |
| passDefendOpportunities | How many chances has user had to pass defend? |
| blockPass | How many times has user tried to block a pass? |
| interceptPass | How many times has user tried to intercept a pass? |
| controlledPlayer | Current player to put player indicator under |
| lastTurboTime | Last time the turbo button was hit during playback |
| chargeTime | How long to turbo charge up for during playback? |
| hotRouteOpportunities | How many plays could a hot route have been called on? |
| hotRouteCalled | How often did was any of the various hot routes used? |
| motionCalled | How often was an avatar sent in motion? |
| playFlipOpportunities | How many plays could the play have been flipped on? |
| playFlips | How many times was a play flipped? |
| defenseShiftOpportunities | How many opportunities was there to make defensive adjustment? |
| shiftLinemen | How often were any of the various line shifts used? |
| shiftLinebackers | How often were any of the various linebacker shifts used? |
| shiftSecondary | How often was any of the various secondary adjustments used? |
| onePointOpportunities | How many times did user have opportunity where they should go for one? |
| twoPointAttempts | How many times did user go for two instead? |
| fourthDownOpportunities | How many times did user have opportunity where they should punt? |
| fourthDownAttempts | How many times did the user attempt a fourth down conversion instead? |
| onsideOpportunities | How many times did user have opportunity where they should do normal kickoff? |
| onsideAttempts | How many times did user have opportunity where they should do normal kickoff but instead did onside kick? |
| choseToReceiveKick | How many times did user choose to receive during coin toss? |
| choseToKickKick | How many times did user choose to kick during coin toss? |
| qbEvades | How many times did user use a qb evade command? |
| qbEvadeOpportunities | How many times could user use a qb evade command? |
| kickoffProfile | How much power the user usually achieves during kickoffs |
| fieldGoalProfile | How much power the user usually achieves during field goals |
| puntProfile | How much power the user usually achieves during punts |
| timeProfiles | How much time is spent in huddle and going to the line in any one of 4 possible situations? |
| currentTimeProfile | How much time is spent in huddle and going to the line in any one of 4 possible situations? |
| reviewTeam | How much time is spent reviewing the field and the play in any one of 3 possible situations? |
| checkPlayReview | During playback, what is the current state? |
| currentTeamReviewProfile | Current team reviews for this play<br>This is the current set of field/play review profiles that should be used to record or playback to. There is a review set for offense passing, offense running, and defense. Each set is just a list of field/play review samples from when the |

-continued

| | |
|---|---|
| | user last played. Each sample says how often they like to pull the camera back and review the field prior to the ball being snapped. Each sample also says whether the user will review the play in front of their opponents. |
| currentTeamPlayReview | Current team reviews for this play |
| snapCount | How to use the hard count? |
| hurryToLine | When to hit the hurry to line button in any of 2 possible situations? |
| currentHurryProfile | When to hit the hurry to line button in any of 2 possible situations? This is the current set of hurry to line profiles to use to record or playback to. There is a set for when simulator 120 is in a critical situation and a set for when simulator 120 is not in a critical situation. Each set contains a set of samples/times when the user presses the hurry to line button. |
| specialMovesProfile | The SPECIAL_MOVES_PROFILE for special moves executed by the user |
| coachProfile | The coaching profile of this user |

SPECIAL_MOVES_RESPONSE_PROFILE

| | |
|---|---|
| turboTime | Time spent in threat grid where to consider turboing |
| moveTime | Time spent in threat grid where to consider using a special move |
| turboCount | How many times did user hit turbo button? |
| moveCount[n] | How often did user use each one of the special moves? |

SPECIAL_MOVES_PROFILE
(460)

| | |
|---|---|
| threatGrid[n] | A SPECIAL_MOVES_RESPONSE_PROFILE for each combination of situations within the threat grid. This is the array of situations a runner can get in to. There are seven locations around a runner. If a defender is in any of those locations we set a bit on our grid index. When simulator 120 is done looking to see where all the close defenders are, simulator 120 has a 7-bit value, hence threatGird[128]. So for each possibility, simulator keeps track of how the user reacts to being in that situation — how often they use the turbo button and how often they use any of the various special moves. |

OFFENSIVE_PLAYCALL_PROFILE
(530)

| | |
|---|---|
| formationFlip | Did user flip formation? |
| playFlip | Did user audible to play flip? |
| onStrongSide | Was simulator 120 on the strong side of field? |
| isPassThrown | Did simulator 120 attempt to throw a pass this play? |
| motionCalled | How many players did simulator 120 send in motion (0, 1, 2)? |
| hotRouteCalled | Did simulator 120 assign a hot route this play? |
| motionState1 | Where did simulator 120 motion the first motion player to? |
| motionState2 | Where did simulator 120 motion the second motion player to? |
| beenCalled | Has simulator 120 called this play during playback? |
| pumpFake | Did QB do a pump fake on this play? |
| move1 | Did user move ball handler during phase1? |
| move2 | Did user move ball handler during phase2? |
| runCharge | Did user charge up immediately on running play? |
| thrownTo | The receiver the ball is passed to |
| passMagnitude | The magnitude the ball is thrown at |
| passTime | When does QB start passing motion? |
| motionPlayer1 | The formation index of first player simulator 120 sends in motion |
| motionPlayer2 | The formation index of second player simulator 120 sends in motion |
| motionTime1 | Did simulator 120 hike ball during motion - if so, when? |
| motionTime2 | Did simulator 120 hike ball during second motion - if so, when? |
| hotRoutePlayer | Who simulator 120 assigned a hot route to |
| hotRoute | What hot route did simulator 120 assign to them? |
| formation | What formation (index) did simulator 120 call? |
| play | What play (index) did simulator 120 call? |
| move1X | Where user moved ball handler relative to ball spot, phase 1 |
| move1Z | Where user moved ball handler relative to ball spot, phase 1 |
| move2X | Where user moved ball handler relative to ball spot, phase 2 |
| move2Z | Where user moved ball handler relative to ball spot, phase 2 |

DEFENSIVE_PLAYCALL_PROFILE
(530)

| | |
|---|---|
| userPlacement | Does the user move user-controlled defender before snap of ball? |
| userBlitz | Did user bring defensive controlled player across line of scrimmage during play? |
| beenCalled | Has simulator 120 called this play during playback? |
| formationFlip | Did user flip formation? |
| shiftLinemen | What type of linemen shift did simulator 120 do? |
| shiftLinebackers | What type of linebacker shift did simulator 120 do? |
| shiftSecondary | What type of secondary shift did simulator 120 do? |
| scramblingQB | Was qb on this play a good scrambler (e.g. Vick)? |
| userPlayer | Which player does user control prior to the snap? |
| adjustPlayer | Which player did simulator 120 make individual adjustments for? |
| individualAdjustment | What adjustment does simulator 120 make for individual player? |
| coverBestReceiver | Did simulator 120 make adjustment to cover best receiver? |
| formation | What formation (index) did simulator 120 call? |
| play | What front (index) did simulator 120 call? |
| coverage | What coverage (index) did simulator 120 call? |
| placementX | Where user places user-controlled defender relative to ball spot in feet? |
| placementZ | Where user places user-controlled defender relative to ball spot in feet? |

OFFENSIVE_SITUATION_PROFILE (510).

| | |
|---|---|
| recordsFilled | Has simulator 120 filled up all play call records? |
| beenCalled | Has any play been called from this situation? |
| nextRecord | Next record to record to? |
| maxRecords | How many records are in this profile? |
| records | The OFFENSIVE_PLAYCALL_PROFILE records stored for this situation |

DEFENSIVE_SITUATION_PROFILE (520)

| | |
|---|---|
| recordsFilled | Has simulator 120 filled up all play call records? |
| beenCalled | Has any play been called from this situation? |
| nextRecord | Next record to record to? |
| maxRecords | How many records are in this profile? |
| records | The DEFENSIVE_PLAYCALL_PROFILE records stored for this situation |

KICK_PROFILE (420)

| | |
|---|---|
| numberKicks | Number of kicks simulator 120 has recorded |
| minPower | Worst kick |
| maxPower | Best kick |
| totalPower | Total power on all kicks |

PLAYBOOK_PROFILE (400)

| | |
|---|---|
| numberPlays | Number of plays recorded using given "playbook" index |
| playbook | Playbook index used to record for playcalling data |
| offensivePlaycallProfiles | The playcall profiles for various situations on offense |
| offensiveSituation | The offensive situation structure points to the various offensivePlaycallProfiles in simulator 120 playbook profile. Both can be considered simulator 120 play call profiles for various situations on offense. The situation profile groups play call profiles in to groups for various situations. |
| defensiveSituation | The playcall profiles for various situations on defense |
| firstDownSituation | The playcall profiles for generic first down situation on offense |
| offensiveBackToGoallineSituation | The playcall profiles for goalline situations on offense |
| offensiveOnGoallineSituation | The playcall profiles for goalline situations on offense |

TIME_PROFILE (430)

| | |
|---|---|
| numberTimes | Number of times simulator 120 has recorded going to the line and being in the huddle |
| totalHuddleTime | Total time spent in the huddle |
| totalAtLineTime | Total time spent at the line |

TEAM_PLAY_REVIEW_PROFILE

| | |
|---|---|
| numberReviews | How many times did simulator 120 review field for given play? |
| start | Times at which simulator 120 started field reviews |
| stop | Times at which simulator 120 stopped field reviews |
| startPlayReview | Start time of when simulator 120 reviewed play |
| stopPlayReview | Stop time of when simulator 120 reviewed play |

TEAM_REVIEW_PROFILE (440)

| | |
|---|---|
| nextRecord | The next team play review profile record |
| recordsFilled | Are all records filled? |
| Records | The TEAM_PLAY_REVIEW_PROFILE records |

PLAY_SNAP_COUNT_PROFILE (450)

| | |
|---|---|
| numberSnapCounts | How many times does simulator 120 do a hard count? |
| snapCount | Times for each of the hard counts |

HURRY_PROFILE (470)

| | |
|---|---|
| nextRecord | The next hurry record |
| recordsFilled | Are all records filled? |
| startTimes | The start time each time to hit the hurry to line button |

COACH_PROFILE (480)

| | |
|---|---|
| numberPassPlays | Number of pass plays recorded |
| numberRunPlays | Number of run plays recorded |
| scoreRunRatio | Based on the score in the game, how often the simulated user runs to how often the simulated user passes |
| redzoneRunRatio | When in the red zone, how often the simulated user runs to how often the simulated user passes |
| downDistanceRunRatio | Based on the down and distance, how often the simulated user runs to how often the simulated user passes |
| numberPassesThrown | Number of passes thrown |

-continued

| | |
|---|---|
| passDirection | How many times have user has passed in any of fives directions (e.g. how many times was the ball thrown to the right)? |
| passDistance | How many times did the simulated user pass to a particular distance down field? |
| passPosition | How many times did a simulator user pass to a particular player position (e.g. tight end)? |
| runDirection | How many times ran in any of five directions? |
| runFormation | How many times did the simulated user run the ball from any of five generic formation types? |
| passFormation | How many times did the simulated user pass the ball from any of five generic formation types? |
| runPackage | How many times have was the ball ran using a particular personal package? |
| passPackage | How many times have was the ball passed using a particular personal package? |
| numberPassMotion | How many times was a player motioned on a passing play? |
| numberRunMotion | How many times was a player motioned on a running play? |
| numberNoHuddleOpportunites | How many times has there been a situation where no huddle offense was inappropriate? |
| numberNoHuddles | How many times has there been a situation where the simulated user inappropriately ran a no huddle offense? |
| numberDefensivePlays | How many times has a defensive play been called? |
| numberZoneDefenses | Of the times that called a defensive play, how many times was a zone coverage called? |
| numberBlitzes | Of the times that a defensive play was called, how many times was a blitz called? |

Figure 10:
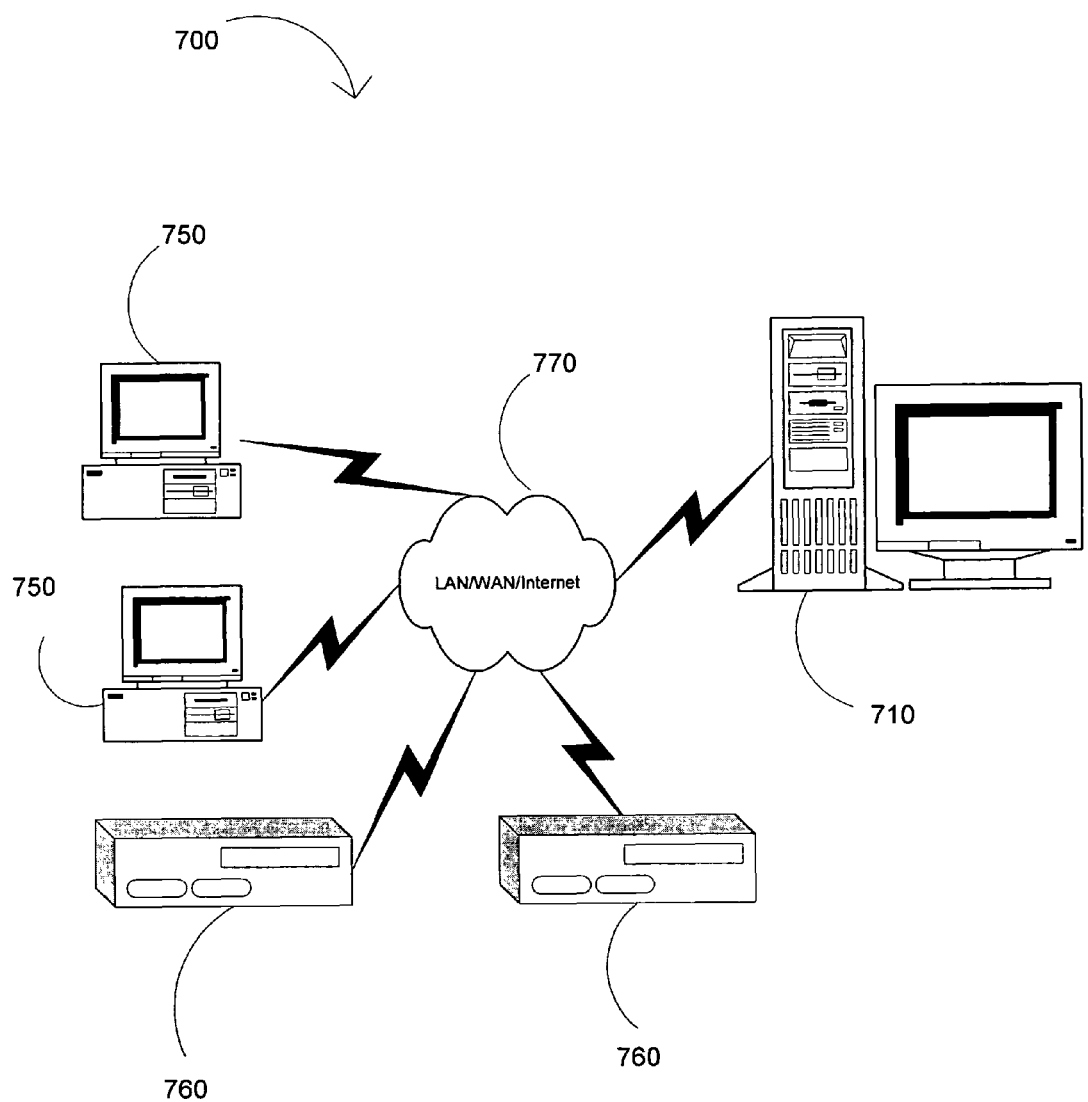
FIG. 10 is a system diagram in accordance with a preferred embodiment of the present invention.

Turning to FIG. 10, the computer program 110, simulator 120, and database 130, as shown in FIG. 1, can reside on a single client console, such as the workstation 750 or a video game console 760, such as an Xbox or Playstation. Alternatively, or in addition, the computer program 110, the simulator 120, and database 130 can reside on a server 710 accessible by one or more client consoles 750/740 via a network, local area or wide area, such as the Internet 770. In yet another alternative, a copy of the computer program 110 may reside on each client console 740/750, and the simulator 120 and database 130 can reside on the server 710. Further, the computer program 110 and the simulator 120 can reside on each client console and the database 130 can reside on the server. Multiple users can compete against each other either on a single console 750/740 or from multiple consoles 750/740. For example, a first user can compete on a first video game console 760 against a second user competing on a second video game console 760. Whether the simulator 120 is on one of the client consoles 740/750 or a server 710, the simulator 120 can operate in learning and/or simulation mode as long as the simulator 120 is communicatively coupled with a copy of the interactive computer program 110. In the case where the simulator 120 and database 130 resides on a server 710, any participating user can upload its own user profile for access by any other participating user, and further any participating users can download or access any user profile available in the database 130.

The interactive computer system 100 may further include a security system that requires an authentication by each user. For example, the simulator 120 resides on a server 710 accessible by participating video game consoles 760. For Xbox video game consoles 760, an Xbox Live authentication server is used. For Playstation 2 game consoles 760, a corresponding authentication server is used as well. Both servers verify whether a participating user has a valid user profile and whether the user is entitled to participate in the interactive computer system 100.

In the foregoing specification, the invention has been described with reference to specific embodiments thereof. It will, however, be evident that various modifications and changes may be made thereto without departing from the broader spirit and scope of the invention. For example, this invention is particularly suited for applications involving video games, but can be applicable for other interactive computer programs. As a further example, each feature of one embodiment can be mixed and matched with other features shown in other embodiments. Additionally and obviously, features may be added or subtracted as desired. Accordingly, the invention is not to be restricted except in light of the attached claims and their equivalents.

What is claimed is:

1. A computer program product comprising a computer-usable medium having a sequence of instructions stored thereon, which, when executed by a processor, causes the processor to execute a first process for learning the behavior of a first user interacting with a multi-user computer game and a second process for simulating the first user interacting with the multi-user computer game, wherein the first process for learning, comprises the steps of:

monitoring the first user's interaction with the computer game for the occurrence of one or more events;

recording one or more first user inputs in response to the occurrence of the one or more events;

analyzing one or more current circumstances during the one or more first user inputs upon the occurrence of the one or more events;

storing the one or more first user inputs in one or more data fields, an occurrence of the respective first user input being a value; and logically associating the one or more data fields with the one or more events and the one or more current circumstances, wherein the association of the one or more data fields with the one or more events and the one or more current circumstances is stored in a data structure including sub data structures, each sub data structure concerning one of a respective circumstance and a respective event and including a set of parameters associated with the one of the respective circumstance and the respective event.

2. The computer program product of claim 1, wherein the second process for simulating enables a second user to interact with a substantial simulation of the first user via the computer program and comprises the steps of:

monitoring the computer game for the one or more events;

analyzing the one or more current circumstances upon the occurrence of the one or more events;

retrieving the one or more data fields associated with the one or more events and the one or more current circumstances; and invoking a response based on the value of the one or more data fields subsequent to the occurrence of the one or more events and the one or more current circumstances, wherein for the respective event and the associated one or more current circumstances, the respective data field associated with the value which is numerically greater provides the invoked response.

3. The computer program product of claim 1, wherein the one or more data fields are organized in one or more profiles.

4. The computer program product of claim 1, wherein the multi-user computer game is a football game, the one or more events include a called pass play and a called run play, and the one or more current circumstances include score and time.

5. The computer program product of claim 4, wherein the one or more events include a blitz, a dive tackle, and a special move.

6. The computer program product of claim 1, wherein the one or more current circumstances include at least one of a spatial position of one or more opposing avatars, a time, a score, and a spatial position of one or more avatars.

7. The computer program product of claim 1, wherein the one or more current circumstances include an archetype of one or more avatars.

8. The computer program product of claim 1, wherein the one or more events includes movement of an avatar.

9. The computer program product of claim 1, wherein the multi-user computer game is a basketball game, the one or more events include at least one of a jump shot, a slam dunk, and a special move, and the one or more current circumstances include at least one of score and time.

10. The computer program product of claim 1, wherein the multi-user computer game is a first-person shooting game having an avatar controlled by the user and an opposing avatar, the one or more events include a direction of movement of the avatar controlled by the user, and the one or more current circumstances include a score and a position of the opposing avatar.

11. The computer program product of claim 1, wherein the simulation process includes invoking a default response if there is no value in the one or more data fields.

12. A system for simulating a first user of a multi-user interactive computer video game, comprising:
a simulator configured to learn a first user's behavioral interactions with the multi-user interactive computer video game and enable a second user to interact via the multi-user interactive computer video game with a substantial simulation of the first user operating the multi-user interactive computer video game; and
a database coupled to the simulator and configured to store data that enables the simulator to substantially simulate the first user,
wherein the data is logically associated information regarding the first user's behavioral interactions, the database being populated with the data by the simulator and being analyzable by the simulator so that the substantial simulation of the first user is effected, the data being recorded as a first profile,
wherein access to the first profile requires a validation of access to the first profile, and wherein an update status of the first profile is analyzed so that any new available update is effected on the first profile.

13. The system of claim 12, wherein the simulator and computer video game are located in a video game console and the database is located in a remote computer system accessible by a plurality of video game consoles.

14. The system of claim 12, wherein the computer video game is located in a local processor and the simulator and the database are located in a remote server accessible by the local processor via a wide area network.

15. The system of claim 12, wherein the computer video game, the simulator, and the database are located in a remote server accessible by the local processor via a wide area network.

16. The system of claim 12, wherein the computer video game is located in a local processor and the simulator and the database are located on a portable memory device enabled to be directly connected to the local processor.

17. The system of claim 12, wherein the multi-user interactive computer video game is a football game having a first team of avatars and a second team of avatars, and the simulator is configured to substantially simulate the first user controlling the second team of avatars playing against the first team of avatars.

18. The system of claim 12, wherein the data includes a user profile corresponding to the first user, wherein the user profile is logically linked with the first user's response to one or more events and one or more situations.

19. The system of claim 18, wherein the simulator is configured to monitor an occurrence of the one or more events and subsequently analyze one or more current circumstances to determine a representation of the first user's response to the occurrence of the one or more events given the one or more current circumstances during the substantial simulation of the first user.

20. The system of claim 19, wherein the multi-user interactive computer video game is a football game having a first team of avatars and a second team of avatars, and the simulator is configured to substantially simulate the first user controlling one of the first and second teams of avatars, and wherein the one or more events includes an offensive play called and a defensive play called, and the one or more current circumstances include a time, a score, and a spatial position of the first and second team of avatars.

21. The system of claim 19, wherein the multi-user interactive computer video game is a race car game having a first car controlled by the first user and a second car controlled by the second user, and the simulator is configured to substantially simulate the first user controlling the first car, and wherein the one or more events includes turning a corner and driving on a straight-away, and the one or more circumstances include spatial position of the second car relative to the first car.

22. A system for simulating a first user of a multi-user interactive computer program, comprising:
a means for recording the behaviors of a first user as the first user is interacting with the computer program;
a means for storing data resulting from the recording, the data being behaviors of the first user logically linked to the interaction of the first user with the computer program; and
a means for simulating the behaviors of the first user when a second user desires to interact with a simulation of the first user based on the stored data,
wherein the means for simulating the behaviors of the first user when a second user desires to interact with a simulation of the first user based on the stored data includes monitoring the operation of the multi-user interactive computer program for one or more events, analyzing one or more current circumstances upon the occurrence of the one or more events, and invoking a response representing the first user's response to the occurrence of the event given the one or more current circumstances, the stored data being recorded as a first profile, wherein access to the first profile requires a validation of access to the first profile, and wherein an update status of the first profile is analyzed so that any new available update is effected on the first profile.

23. The system of claim 22, wherein the multi-user interactive computer program is a football game.

24. The system of claim 22, wherein the multi-user interactive computer program is a basketball game.

25. The system of claim 22, wherein the multi-user interactive computer program is a chess game.

26. The system of claim 22, wherein the multi-user interactive computer program is a football game having a first team of avatars controlled by the first user and a second team of avatars controlled by the second user, wherein the one or more events include movement of the second team of avatars, offensive play called, and defensive play called, and the one or more current circumstances include score, time and spatial position of the first and second teams of avatars.

27. The system of claim 22, wherein the one or more current circumstances includes score and time.

28. The system of claim 22, wherein the one or more current circumstances includes the spatial position of one or more avatars.

29. The system of claim 22, wherein the one or more current circumstances includes an archetype of one or more avatars.

30. The system of claim 22, wherein the one or more events includes the movement of one or more avatars.

31. A method enabling a second user to interact via a multi-user interactive computer video game with a substantial simulation of a first user operating the multi-user interactive computer video game, comprising the steps of:
analyzing a first user's interaction with a multi-user interactive computer video game;
storing data related to the first user's interaction with the multi-user interactive computer video game; and
simulating the first user's interaction with the multi-user interactive computer video game during a second user's interaction with the multi-user interactive computer video game,
wherein the step of storing data includes recording one or more first user inputs in response to the occurrence of the one or more events, storing the one or more first user inputs in one or more data fields, and logically associating the one or more data fields with the one or more events and the one or more current circumstances,
wherein the association of the one or more data fields with the one or more events and the one or more current circumstances is stored in a data structure including sub data structures, each sub data structure concerning one of a respective circumstance and a respective event and including a set of parameters associated with the one of the respective circumstance and the respective event.

32. The method of claim 31, wherein the analyzing step includes
monitoring the first user's interaction with the computer game for the occurrence of one or more events, and
analyzing one or more current circumstances during input of one or more first user inputs upon the occurrence of the one or more events.

33. The method of claim 31, wherein the simulating step includes:
monitoring the computer game for the one or more events;
analyzing the one or more current circumstances upon the occurrence of the one or more events;
retrieving the one or more data fields associated with the one or more events and the one or more current circumstances; and
invoking a response based on the value of the one or more data fields subsequent to the occurrence of the one or more events and the one or more current circumstances.

34. The method of claim 31, further comprising:
organizing one or more data fields in one or more user profiles.

35. The method of claim 32, wherein the one or more current circumstances include game time.

36. The method of claim 32, wherein the one or more current circumstances include game score.

37. The method of claim 32, wherein the one or more current circumstances include a spatial position of one or more avatars of first user.

38. The method of claim 37, wherein the one or more current circumstances include a spatial position of one or more opposing avatars.

39. The method of claim 37, wherein the one or more current circumstances include an archetype of one or more avatars.

40. The method of claim 37, wherein the one or more events includes movement of an avatar.

41. The method of claim 31, further comprising:
invoking a default response if there is no data available to simulate the first user's interaction.

42. The computer program product of claim 1, wherein the second process for simulating enables a second user to interact with a substantial simulation of the first user via the computer program, the second process comprising:
monitoring the computer game for the one or more events;
analyzing the one or more current circumstances upon the occurrence of the one or more events;
retrieving the one or more data fields associated with the one or more events and the one or more current circumstances; and
invoking a response based on the value of the one or more data fields subsequent to the occurrence of the one or more events and the one or more current circumstances,
wherein for the respective event and the associated one or more current circumstances, the respective data field associated with the value which is randomly selected provides the invoked response.

43. The computer program product of claim 1, wherein the second process for simulating enables a second user to interact with a substantial simulation of the first user via the computer program, the second process comprising:
monitoring the computer game for the one or more events;
analyzing the one or more current circumstances upon the occurrence of the one or more events;
retrieving the one or more data fields associated with the one or more events and the one or more current circumstances; and
invoking a response based on the value of the one or more data fields subsequent to the occurrence of the one or more events and the one or more current circumstances,
wherein, the value of the respective data field being a record of when the response based on the respective data field was last selected, if the value is greater than an average of all values associated with data fields associated with the respective event and the associated one or more current circumstances, then the first user input associated with the respective data field provides the invoked response.

* * * * *